United States Patent
Kenney et al.

(10) Patent No.: US 9,913,266 B2
(45) Date of Patent: Mar. 6, 2018

(54) METHODS AND APPARATUS FOR SCHEDULING A NARROWBAND RESPONSE TO WIDEBAND DATA IN A HIGH-EFFICIENCY WIRELESS LOCAL AREA NETWORK

(71) Applicant: Intel IP Corporation, Santa Clara, CA (US)

(72) Inventors: Thomas J Kenney, Portland, OR (US); Chittabrata Ghosh, Fremont, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 91 days.

(21) Appl. No.: 14/851,786

(22) Filed: Sep. 11, 2015

(65) Prior Publication Data
US 2017/0079011 A1    Mar. 16, 2017

(51) Int. Cl.
| H04W 4/00 | (2009.01) |
| H04W 72/04 | (2009.01) |
| H04L 1/00 | (2006.01) |
| H04W 84/12 | (2009.01) |

(52) U.S. Cl.
CPC ............ H04W 72/042 (2013.01); H04L 1/00 (2013.01); H04W 72/0413 (2013.01); H04W 84/12 (2013.01)

(58) Field of Classification Search
CPC ........... H04W 72/042; H04W 72/0413; H04W 84/12; H04L 1/00
USPC ........................................................ 370/330
See application file for complete search history.

(56) References Cited

U.S. PATENT DOCUMENTS

| 2007/0242765 | A1* | 10/2007 | Parizhisky | H04L 5/023 375/260 |
| 2013/0121249 | A1* | 5/2013 | Ji | H04W 4/001 370/328 |
| 2014/0321449 | A1* | 10/2014 | Dong | H04L 61/6072 370/338 |
| 2015/0180616 | A1* | 6/2015 | Lee | H04L 1/1812 370/329 |
| 2015/0264718 | A1* | 9/2015 | Yu | H04W 72/02 370/329 |

* cited by examiner

*Primary Examiner* — Sai-Ming Chan
(74) *Attorney, Agent, or Firm* — Hanley, Flight & Zimmerman, LLC

(57) ABSTRACT

Methods and apparatus are disclosed for scheduling a narrowband uplink transmission from a wireless station to a wireless access point in response to a station-specific wideband downlink transmission from the access point to the station. A station-specific downlink frame includes a station identifier associated with the station, and further includes resource allocation information associated with an uplink transmission channel over which the station is to transmit an uplink frame. The station-specific downlink frame is transmitted from the access point to the station over a downlink transmission channel having an associated downlink bandwidth. Based on the resource allocation information, the access point receives the uplink frame from the station over the uplink transmission channel. The uplink transmission channel has an associated uplink bandwidth that is narrower than the downlink bandwidth of the downlink transmission channel. In some disclosed examples, the uplink transmission channel is a sub-channel of the downlink transmission channel.

25 Claims, 14 Drawing Sheets

METHODS AND APPARATUS FOR SCHEDULING A NARROWBAND RESPONSE TO WIDEBAND DATA IN A HIGH-EFFICIENCY WIRELESS LOCAL AREA NETWORK

FIELD OF THE DISCLOSURE

This disclosure relates generally to the architecture and operation of a wireless local area network (WLAN), and, more particularly, to methods and apparatus for scheduling a narrowband response to wideband data in a High-Efficiency WLAN (HEW).

BACKGROUND

In a wireless local area network (WLAN), a mobile station connects to an access point of a local area network (LAN) via a wireless radio connection. The operation and/or architecture of most modern WLANs is based on the 802.11 body of standards developed by the Institute of Electrical and Electronics Engineers (IEEE). A High-Efficiency WLAN (HEW) study group within the IEEE 802.11 working group has been created to consider potential improvements in the spectrum efficiency and data throughput of WLANs operating according to previously-adopted versions of the 802.11 standards.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
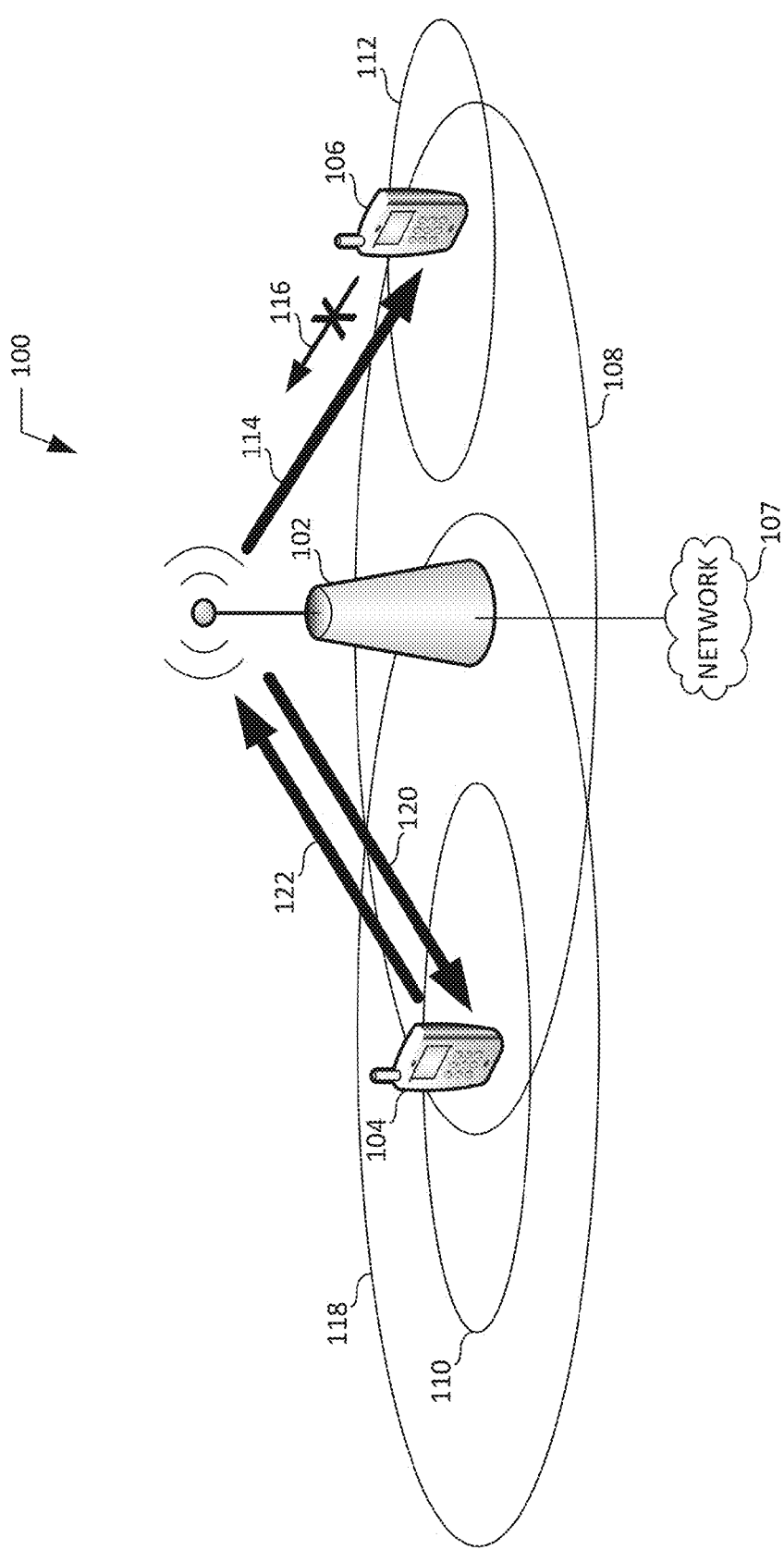
FIG. 1 is an example High-Efficiency WLAN environment including an example access point and an example first station constructed in accordance with the teachings of this disclosure.

Standards for the operation and/or architecture of High-Efficiency WLAN (HEW) are being developed as IEEE 802.11ax. A digital modulation scheme known as orthogonal frequency-division multiple access (OFDMA) has been specified for use in IEEE 802.11ax. OFDMA, which is a multi-user version of orthogonal frequency-division multiplexing (OFDM), allows for allocation of minimum resource units having smaller bandwidths to multiple users simultaneously. A minimum resource unit is a function of the number of OFDM sub-carriers assigned for the resource. For example, the assignment of twenty-six (26) sub-carriers out of a two-hundred-fifty-six (256) point Fast Fourier Transform (FFT) within a 20 megahertz (MHz) channel results in a minimum resource unit allocation and/or bandwidth allocation in OFDMA of about 2.03 MHz (e.g., calculated as ((26/256)*20 MHz). The allocation of minimum resource units as small as about 2.03 MHz can facilitate narrowband data uplink access to nine wireless stations simultaneously in a wideband 20 MHz channel.

In the current protocol within HEW, the use of OFDMA for uplink data transmissions is enabled by a trigger frame. For example, when an access point wants narrowband uplink transmissions using OFDMA, the access point contends for the wireless medium and, once successful, the access point sends a trigger frame that is understood by stations associated with the access point that are compliant with the 802.1 lax standard. The stations then parse the OFDMA trigger frame, which provides the metadata by which the stations are subsequently able to respectively send narrowband uplink transmissions using available OFDMA minimum resource units.

Thus, under the current 802.11ax protocol described above, a station must first receive and parse an OFDMA trigger frame included in a wideband (e.g., 20 MHz) downlink transmission sent to the station (among other stations) from the access point in order for the station to send a narrowband (e.g., 2.03 MHz) uplink transmission to the access point. In instances where a single station would like to send a narrowband uplink transmission and the access point would like to send a downlink transmission to just that single station, the access point must still send an OFDMA trigger frame. Thus, a wideband (e.g., 20 MHz) transmission always precedes a narrowband (e.g., 2.03 MHz) transmission. In such instances, the overhead of the network is disadvantageously increased, because the OFDMA trigger frame forces all of the 802.1 lax compliant stations (including the single station) that are associated with the access point to wake up and parse the trigger frame. Absent the scheduling and allocation of resources provided by the trigger frame, however, the station is unable to send a narrowband (e.g., 2.03 MHz) uplink transmission to the access point and would instead have to send a wideband (e.g., 20 MHz) uplink transmission. As described in greater detail below, instances may arise in which the station is located at a distance from the access point where a narrowband (e.g., 2.03 MHz) uplink transmission can successfully be received by the access point, but a wideband (e.g., 20 MHz) uplink transmission cannot.

Examples disclosed herein enable a wireless access point to schedule a narrowband uplink transmission by a wireless station in response to a station-specific wideband downlink transmission from the access point to the station. Examples disclosed herein also enable a wireless station to provide a narrowband uplink transmission to a wireless access point in response to a station-specific wideband downlink transmission from the access point to the station.

In some disclosed examples, a station-specific downlink frame to be transmitted from an access point to a station over a downlink transmission channel includes a station identifier associated with the station and further includes resource allocation information associated with an uplink transmission channel over which the station is to transmit an uplink frame. In some disclosed examples, the uplink transmission channel is a sub-channel of the downlink transmission channel. As used herein, the term "sub-channel" refers to a minimum resource unit that has been assigned and/or allocated within a channel. In some disclosed examples, the resource allocation information specifies a minimum resource unit for the uplink frame. In some disclosed examples, the resource allocation information includes a resource selection notification that notifies the station to select a minimum resource unit for the uplink frame from among a plurality of available minimum resource units corresponding to available sub-channels of the downlink transmission channel. In some disclosed examples, the minimum resource unit corresponds to the uplink transmission channel. In some disclosed examples, the station-specific downlink frame further includes timing information associated with a time by which the station is to transmit the uplink frame to the access point over the uplink transmission channel.

In some disclosed examples, the station-specific downlink frame is transmitted from the access point to the station over a downlink transmission channel having an associated downlink bandwidth. In some disclosed examples, the downlink bandwidth is 20 MHz. In some disclosed examples, the station receives the station-specific downlink frame from the access point over the downlink transmission channel.

In some disclosed examples, based on the resource allocation information, the station transmits the uplink frame to the access point over the uplink transmission channel. In some disclosed examples, the uplink frame includes an acknowledgement frame. In some disclosed examples, the access point receives the uplink frame from the station over the uplink transmission channel. In some disclosed examples, the uplink transmission channel has an associated uplink bandwidth that is narrower than the downlink bandwidth of the downlink transmission channel. In some disclosed examples, the uplink bandwidth is about 2.03 MHz. In some disclosed examples, the uplink transmission channel is a sub-channel of the downlink transmission channel.

FIG. 1 is an example High-Efficiency WLAN environment 100 in which an example access point 102 and an example first station 104 constructed in accordance with the teachings of this disclosure may be used to schedule a narrowband transmission from the first station 104 to the access point 102 in response to a station-specific wideband transmission from the access point 102 to the first station 104. In the illustrated example, the access point 102 communicates with the first station 104 via a wireless radio connection. The example first station 104 may be implemented using, for example, a laptop computer, a tablet, a smartphone, or any other type of wireless computing device that is capable of communicating with the example access point 102. The example first station 104 is a wireless computing device that is able to understand, interpret and/or comply with the scheduling of a narrowband transmission from the first station 104 to the access point 102 in response to a station-specific wideband transmission from the access point 102 to the first station 104. The example first station 104 may be a next generation wireless computing device that is compliant with the 802.11ax standards that are currently under development.

In the illustrated example, the access point 102 also communicates with an example second station 106 via a wireless radio connection. The example second station 106 may be implemented using, for example, a laptop computer, a tablet, a smartphone, or any other type of wireless computing device that is capable of communicating with the example access point 102. The example second station 106 is a legacy wireless computing device that may be unable to understand, interpret and/or comply with the scheduling of a narrowband transmission from the second station 106 to the access point 102 in response to station-specific wideband data transmitted from the access point 102 to the second station 106. The second station 106 may be unable to understand, interpret and/or comply with aspects of the 802.11ax standards that are currently under development.

In the illustrated example, the access point 102 serves as a gateway by which the example first station 104 and/or the example second station 106 may access a wired network 107 (e.g., a wired local area network) to which the access point 102 is connected. In some examples, the access point 102 may be in communication with a router, an Ethernet switch and/or a broadband modem. In some examples, a router, an Ethernet switch and/or a broadband modem may be formed integrally with the access point 102. In some examples, the wired network 107 may be a LAN or the Internet, and may include an Ethernet connection, a digital subscriber line (DSL), a telephone line, or a coaxial cable.

In the illustrated example, the access point 102 provides an example wideband coverage area 108 within which the access point 102 is able to transmit one or more downlink frames to one or more stations such as, for example, the first station 104 and/or the second station 106. In the illustrated example, the wideband coverage area 108 represents the range and/or area over which the access point 102 can successfully transmit a downlink frame via a 20 MHz channel based on an access point transmission power (P(AP)) associated with the access point 102.

In the illustrated example, the first station 104 is associated with an example wideband coverage area 110 within which the first station 104 is able to transmit one or more uplink frames. In the illustrated example, the wideband coverage area 110 represents the range and/or area over which the first station 104 can successfully transmit an uplink frame via a 20 MHz channel based on a station transmission power (P(STA1)) associated with the first station 104.

The second station 106 is similarly associated with an example wideband coverage area 112 within which the second station 106 is able to transmit one or more uplink frames. In the illustrated example, the wideband coverage area 112 represents the range and/or area over which the second station 106 can successfully transmit an uplink frame via a 20 MHz channel based on a station transmission power (P(STA2)) associated with the second station 106.

In the illustrated example, the station transmission power (P(STA1)) associated with the first station 104 is substantially the same as the station transmission power (P(STA2)) associated with the second station 106, both of which are substantially less than the access point transmission power (P(AP)) associated with the access point 102. As a result, a link budget imbalance arises whereby the wideband coverage area 108 over which the access point 102 can successfully transmit a downlink frame to the first station 104 or the second station 106 via a 20 MHz channel exceeds both of the respective wideband coverage areas 110, 112 over which the first station 104 and the second station 106 can successfully transmit respective uplink frames to the access point 102 via a 20 MHz channel. Thus, situations will arise where a downlink transmission can be received by the first station 104 or the second station 106, but an uplink transmission from the first station 104 or the second station 106 cannot be received by the access point 102.

In instances where the first station 104 (or the second station 106) is positioned near the outer boundary of the example wideband coverage area 108 associated with the access point 102, the link budget imbalance will generally prevent the first station 104 (or the second station 106) from being able to successfully transmit a 20 MHz uplink frame to the access point 102 in response to a 20 MHz downlink frame received by the first station 104 (or the second station 106) from the access point 102. For example, as illustrated in FIG. 1, while the second station 106 is located within the wideband (e.g., 20 MHz) coverage area 108 associated with access point 102, the access point 102 is not located within the wideband (e.g., 20 MHz) coverage area 112 associated with the second station 106. Thus, although the second station 106 is able to receive an example downlink frame 114 from the access point 102 via a wideband (e.g., 20 MHz) channel, the second station 106 is unable to successfully send an example uplink frame 116 to the access point 102 via a corresponding wideband (e.g., 20 MHz) channel. In the illustrated example, the second station 106, by virtue of being a legacy device, may be unable to understand, interpret and/or comply with a protocol that schedules a narrowband (e.g., 2.03 MHz) uplink transmission from the second device 106 to the access point 102.

In the illustrated example, the first station 104, in addition to being associated with the example wideband coverage area 110, is further associated with an example narrowband coverage area 118 within which the first station 104 is able to transmit one or more uplink frames to the access point 102. In the illustrated example, the narrowband coverage area 118 represents the range and/or area over which the first station 104 can successfully transmit an uplink frame via a 2.03 MHz channel based on the station transmission power (P(STA1)) associated with the first station 104. Reducing the bandwidth of the uplink frame transmission from 20 MHz down to 2.03 MHz results in the 2.03 MHz uplink frame transmission being afforded a link budget that is approximately 9.5 decibels (dB) higher relative to the link budget associated with the 20 MHz uplink frame transmission. As a result of the increased link budget afforded to the 2.03 MHz uplink frame transmission, the narrowband coverage area 118 over which the first station 104 can successfully transmit the 2.03 MHz uplink frame to the access point 102 is substantially larger than, and/or has a substantially greater range relative to that of, the wideband coverage area 110 over which the first station 104 can successfully transmit the 20 MHz uplink frame to the access point 102.

The ability of the first station 104 to transmit a narrowband (e.g., 2.03 MHz) uplink frame to the access point 102 in response to a wideband (e.g., 20 MHz) downlink frame received by the first station 104 from the access point 102 advantageously reduces and/or eliminates the wideband coverage area discrepancies arising from the link budget imbalance scenario described above. In the illustrated example of FIG. 1, the aforementioned benefit is attained by virtue of the access point 102 transmitting an example station-specific wideband downlink frame 120 including resource allocation information to the first station 104 via a wideband channel. The wideband channel may be, for example, a 20 MHz, 40 MHz, 80 MHz or 160 MHz channel. The resource allocation information included in the station-specific wideband downlink frame 112 results in the scheduled transmission of an example narrowband uplink frame 122 from the station 104 to the access point 102 via a narrowband channel. In the illustrated example, the narrowband channel may be a sub-channel of the wideband channel. The narrowband channel may be, for example, a 2.03 MHz channel that is a sub-channel and/or minimum resource unit of, for example, a 20 MHz channel.

As described below, in the illustrated example, the station-specific wideband downlink frame 120 includes a station identifier associated with the first station 104. For example, the first station 104 may have an associated medium access control (MAC) address that uniquely identifies the first station 104. The inclusion of a station identifier, such as a MAC address, in the downlink frame 120 results in the downlink frame 120 being targeted specifically to the first station 104. In other words, the downlink frame 120 is station-specific. In instances where the access point 102 desires to provide data to only a single station (e.g., the first station 104), the station-specific nature of the example downlink frame 120 provides an advantage over the multi-station downlink trigger frame that is required under the OFDMA protocol described above. For example, because the station-specific wideband downlink frame 120 is targeted to only the example first station 104, the first station 104 is able to transmit a narrowband (e.g., 2.03 MHz) uplink frame to the access point 102 without other stations associated with the access point 102 having to wake up and/or parse a trigger frame, as would occur under the OFDMA protocol. The example station-specific wideband downlink frame 120 may include a preamble containing information from which stations other than the example first station 104 for which the downlink frame 120 is targeted may quickly determine that the downlink frame 120 does not include a trigger frame. As a result, the station-specific wideband downlink frame 120 provides a reduction in network overhead relative to the network overhead associated with use of the OFDMA protocol. Network throughput is also improved, and power is saved as a result of eliminating the need for other stations associated with the access point 102 to awake and parse a trigger frame.

In the illustrated example, the resource allocation information included within the example station-specific wideband downlink frame 120 identifies, allocates and/or signals a narrowband (e.g., 2.03 MHz) channel resource and/or minimum resource unit to be utilized by the first station 104 when transmitting the narrowband uplink frame 122 to the access point 102. In some examples, the resource allocation information specifies the narrowband (e.g., 2.03 MHz) channel resource and/or minimum resource unit for the uplink transmission. In such examples, the narrowband channel resource and/or minimum resource unit is specified by the access point 102. Alternatively, the resource allocation information may include a resource selection notification that notifies the first station 104 to select a narrowband (e.g., 2.03 MHz) channel resource and/or minimum resource unit for the uplink transmission from among a plurality of available channel resources and/or available minimum resource units corresponding to available sub-channels of the wideband (e.g., 20 MHz) channel over which the station-specific wideband downlink frame 120 is transmitted. In such examples, the narrowband channel resource and/or minimum resource unit is selected by the first station 104 based on the resource selection notification. In some examples, the first station 104 selects the narrowband channel resource and/or minimum resource unit that provides the most efficient (e.g., the greatest) link performance based on estimates derived from the received station-specific wideband downlink frame 120.

In the illustrated example, the station-specific wideband downlink frame 120 may further include timing information that identifies, allocates and/or signals a time by which the first station 104 is to transmit the example narrowband uplink frame 122 to the access point 102 in response to the access point 102 transmitting the example station-specific wideband downlink frame 120 to the first station 104. In some examples, the timing information may include parameters from which time can be derived such as, for example, modulation and/or coding parameters associated with the first device 104, the volume of data to be transmitted, and the bandwidth of the transmission. In some examples, the timing information may be based on the interframe spacing time associated with the example station-specific wideband downlink frame 120.

Prior to being able to initially receive a downlink data transmission (e.g., the example downlink frames 112, 120) from an access point (e.g., the example access point 102), a station (e.g., the example first station 104 or the example second station 106) may first need to locate and join the access point, become authenticated by the access point, and become associated with the access point. For example, the first station 104 may identify a compatible access point (e.g., the access point 102) via passive scanning. In passive scanning, the access point 102 periodically sends a beacon frame to announce its presence and relay information such as a service set identifier (SSID) and other parameters regarding the access point 102 to stations (e.g., the first station 104 or the second station 106) that are within range. The first station 104 implementing passive scanning listens for access point beacons as the basis for choosing an access point (e.g., the access point 102) to be associated with or to join.

Alternatively, the first station 104 may identify a compatible access point (e.g., the access point 102) via active scanning. In active scanning, the first station 104 sends a probe request frame to determine which access points (e.g., the access point 102) are within range. Access points (e.g., the access point 102) that are within range respond to the probe request frame by sending the first station 104 a probe response frame containing information such as the SSID of the access point 102, capability information, etc.

Regardless of which scanning approach is implemented, the first station 104 may store the SSID and other information pertaining to the access point(s) (e.g., the access point 102) of interest. The first station 104 may then decide which access point (e.g., the access point 102) to join based on parameters such as power level, signal strength, etc. associated with the access point 102. In connection with joining the access point 102, the first station 104 may provide the access point 102 with capability information describing the type of device that the first station 104 is (e.g., whether the first station 104 is 802.11ax compliant), as well as the technical capabilities of the device.

Once the first station 104 has located and joined the access point 102, the first station 104 may then establish its identity to the access point 102 via an authentication process. For example, the first station 104 may establish its identity to the access point 102 utilizing an open system authentication protocol. In open system authentication, the first station 104 sends an authentication request frame containing the identity of the first station 104 (e.g., a MAC address associated with the first station 104) to the access point 102. The access point 102 responds to the authentication request frame by sending an authentication response frame to the first station 104 indicating acceptance or rejection of the authentication request.

Alternatively, the first station 104 may establish its identity to the access point 102 utilizing a shared key authentication protocol. In shared key authentication, the first station 104 sends an authentication request frame containing the identity of the first station 104 (e.g., a MAC address associated with the station) to the access point 102. The access point 102 responds to the authentication request frame by sending an authentication response frame to the first station 104 containing challenge text. The first station 104 must then send an encrypted version of the challenge text in a second authentication request frame back to the access point 102. The access point 102 determines whether the challenge text recovered after decryption matches the challenge text that was sent by the access point 102. Based on this determination, the access point 102 replies to the first station 104 with a second authentication response frame indicating acceptance or rejection of the authentication request.

Once the first station 104 has been authenticated by the access point 102, the first station 104 may associate with the access point 102 to gain access to the wired network 107 for which the access point 102 serves as a gateway. For example, the first station 104 may associate itself with the access point 102 by sending an association request frame to the access point 102. The access point 102 responds to the association request frame by sending an association response frame to the first station 104 indicating acceptance or rejection of the association request. The access point 102 may store a basic service set (BSS) that includes information identifying each station (e.g., the first station 104) that has been authenticated and associated with the access point 102. Once the first station 104 has been authenticated and associated with the access point 102, the access point 102 may begin processing and transmitting data frames to be sent to the first station 104 (e.g., downlink frames) and/or to be received from the first station 104 (e.g., uplink frames).

Figure 2:
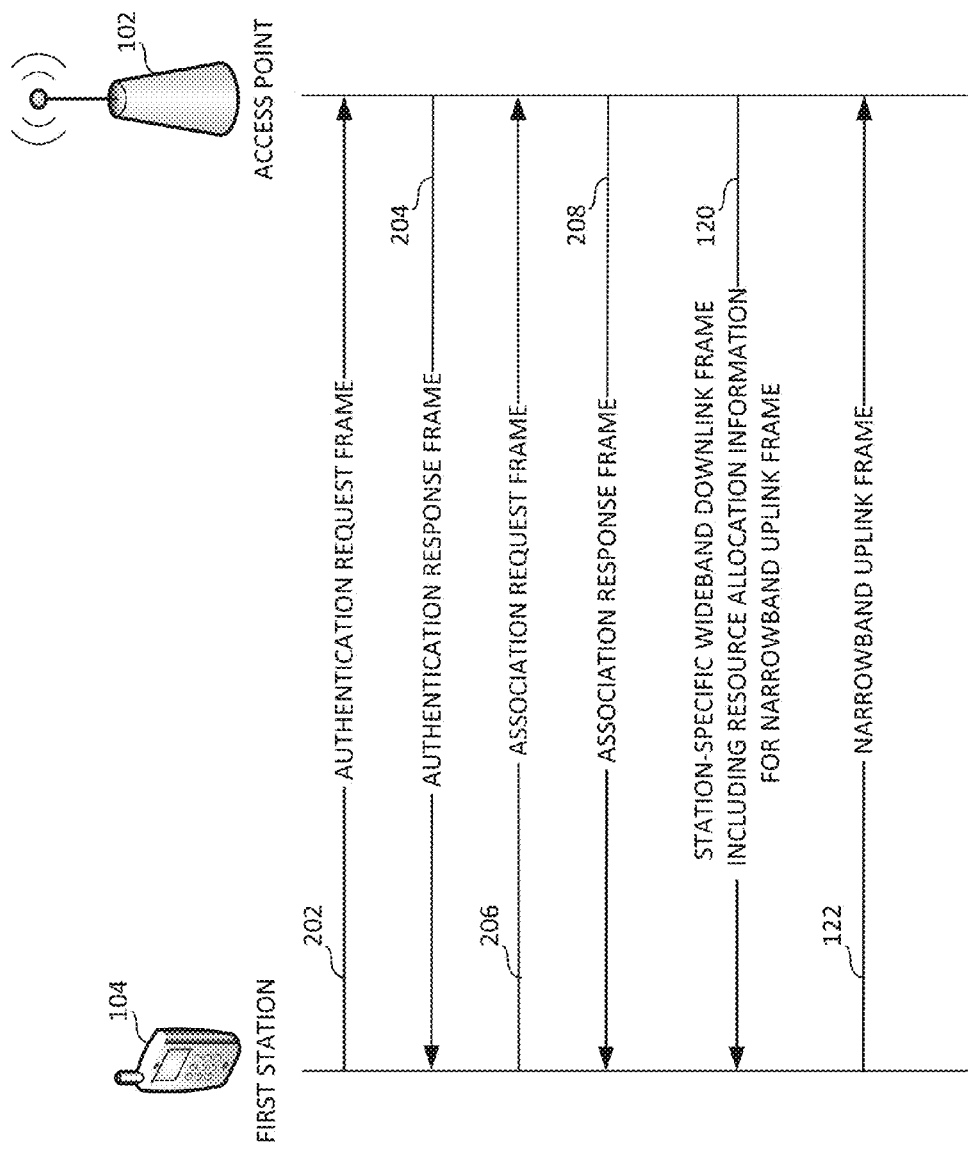
FIG. 2 is a communication flow diagram illustrating the example access point of FIG. 1 receiving a scheduled narrowband uplink transmission from the example first station of FIG. 1 in response to a station-specific wideband downlink transmission from the access point to the first station.

FIG. 2 is a communication flow diagram illustrating the example access point 102 of FIG. 1 preparing for and receiving the example scheduled narrowband uplink transmission 122 from the example first station 104 of FIG. 1 in response to the example station-specific wideband downlink transmission 120 of FIG. 1 from the access point 102 to the first station 104. The illustrated example of FIG. 2 applies to instances in which the example access point 102 determines (a) that the first station 104 is capable of transmitting a narrowband uplink frame to the access point 102 in response to a wideband downlink frame transmitted from the access point 102 to the first station 104, and (b) that the wideband downlink frame to be transmitted from the access point 102 to the first station 104 includes data intended only for the first station 104.

In the illustrated example of FIG. 2, the first station 104 sends an example authentication request frame 202 to the access point 102. The access point 102 responds to the authentication request frame 202 by sending an example authentication response frame 204 to the first station 104. In the illustrated example, the authentication response frame 204 indicates acceptance of the authentication request.

Next, the first station 104 sends an example association request frame 206 to the access point 102. The access point 102 responds to the association request frame 206 by sending an example association response frame 208 to the first station 104. In the illustrated example, the association response frame 208 indicates acceptance of the association request. Although not specifically illustrated in FIG. 2, additional and/or alternative frames may be exchanged between the access point 102 and the first station 104 to facilitate the authentication and/or association processes described above.

In the illustrated example of FIG. 2, following and/or in conjunction with the aforementioned example authentication and/or association processes, the access point 102 determines, based on capability information provided by the first station 104 during and/or prior to the authentication and/or association processes, that the first station 104 is capable of transmitting a narrowband uplink frame to the access point 102 in response to a wideband downlink frame transmitted from the access point 102 to the first station 104. The access point 102 also determines that the wideband downlink frame to be transmitted from the access point 102 to the first station 104 includes data intended only for the first station 104. Based on these determinations, the access point 102 sends the example station-specific wideband downlink frame 120 including resource allocation information for the narrowband uplink frame 122 to the first station 104. In response to the station-specific wideband downlink frame 120 transmitted by the access point 102, and based on the resource allocation information included therein, the first station 104 sends the example narrowband uplink frame 122 to the access point 102 over a specified narrowband uplink channel. In the illustrated example of FIG. 2, the narrowband uplink frame 122 may include and/or constitute an acknowledgement frame providing the access point 102 with notification that the example station-specific wideband downlink frame 120 was free of errors.

Figure 3:
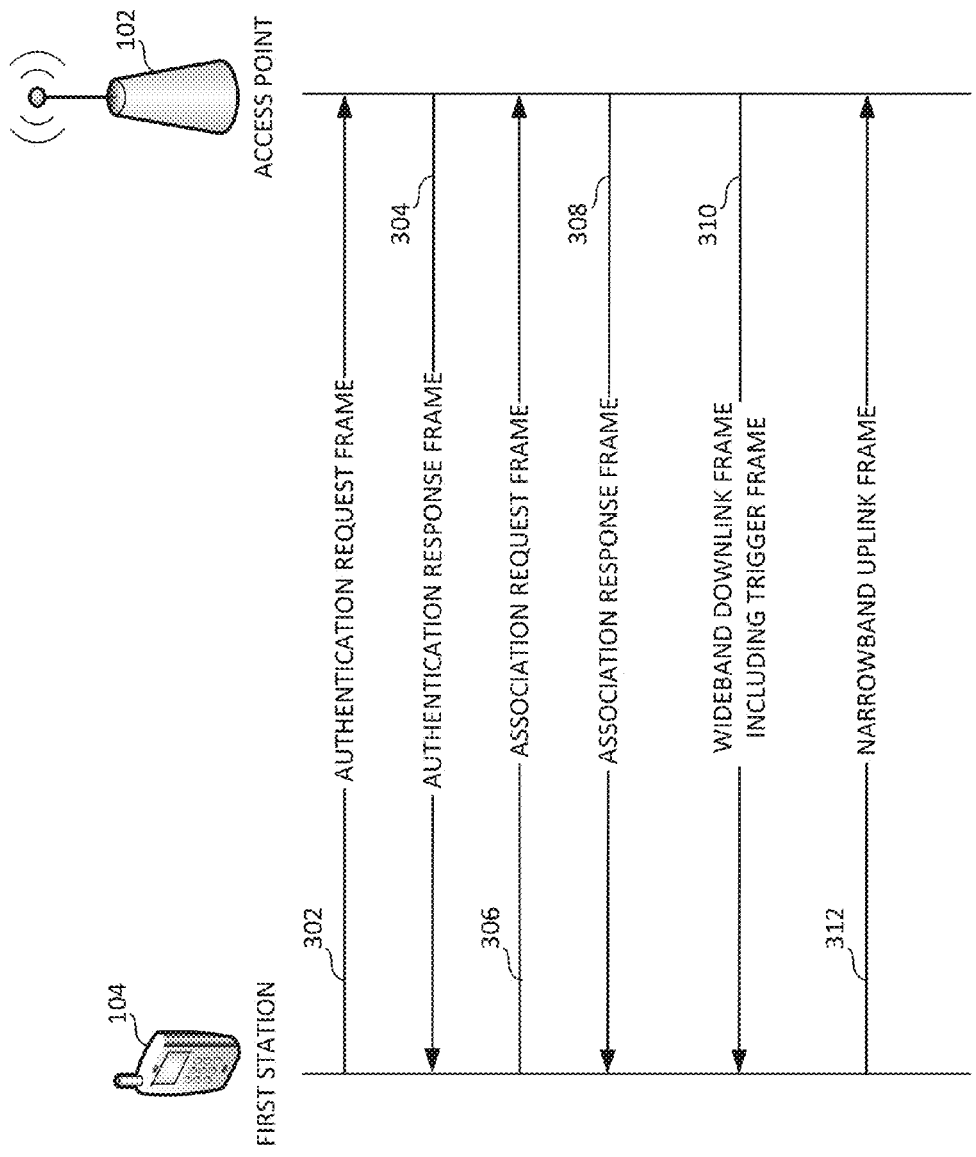
FIG. 3 is a communication flow diagram illustrating the example access point of FIG. 1 receiving a scheduled narrowband uplink transmission from the example first station of FIG. 1 in response to a wideband downlink transmission including a trigger frame from the access point to the first station.

FIG. 3 is a communication flow diagram illustrating the example access point 102 of FIG. 1 receiving a scheduled narrowband uplink transmission from the example first station 104 of FIG. 1 in response to a wideband downlink transmission including a trigger frame from the access point 102 to the first station 104. The illustrated example of FIG. 3 applies to instances in which the example access point 102 determines (a) that the first station 104 is capable of transmitting a narrowband uplink frame to the access point 102 in response to a wideband downlink frame transmitted from the access point 102 to the first station 104, and (b) that the wideband downlink frame to be transmitted from the access point 102 to the first station 104 includes data intended for one or more stations in addition to the first station 104.

In the illustrated example of FIG. 3, the first station 104 sends an example authentication request frame 302 to the access point 102. The access point 102 responds to the authentication request frame 302 by sending an example authentication response frame 304 to the first station 104. In the illustrated example, the authentication response frame 304 indicates acceptance of the authentication request. Next, the first station 104 sends an example association request frame 306 to the access point 102. The access point 102 responds to the association request frame 306 by sending an example association response frame 308 to the first station 104. In the illustrated example, the association response frame 308 indicates acceptance of the association request. Although not specifically illustrated in FIG. 3, additional and/or alternative frames may be exchanged between the access point 102 and the first station 104 to facilitate the authentication and/or association processes described above.

In the illustrated example of FIG. 3, following and/or in conjunction with the aforementioned example authentication and/or association processes, the access point 102 determines, based on capability information provided by the first station 104 during and/or prior to the authentication and/or association processes, that the first station 104 is capable of transmitting a narrowband uplink frame to the access point 102 in response to a wideband downlink frame transmitted from the access point 102 to the first station 104. The access point 102 also determines that the wideband downlink frame to be transmitted from the access point 102 to the first station 104 includes data intended only for one or more stations in addition to the first station 104. Based on these determinations, the access point 102 sends an example wideband downlink frame 310 including a trigger frame to any stations that have been associated with the access point 102, including the first station 104. In response to the downlink frame 310 transmitted by the access point 102, the first station 104 (along with any other station(s) that has/have received the trigger frame) parses the trigger frame to determine a narrowband channel resource to be utilized for sending an example narrowband uplink frame 312 to the access point 102. After the first station 104 has determined the narrowband channel resource for the narrowband uplink frame 312, the first station 104 sends the narrowband uplink frame 312 to the access point 102. In the illustrated example of FIG. 3, the narrowband uplink frame 312 may include and/or constitute an acknowledgement frame providing the access point 102 with notification that the example wideband downlink frame 310 including the trigger frame was free of errors.

Figure 4:
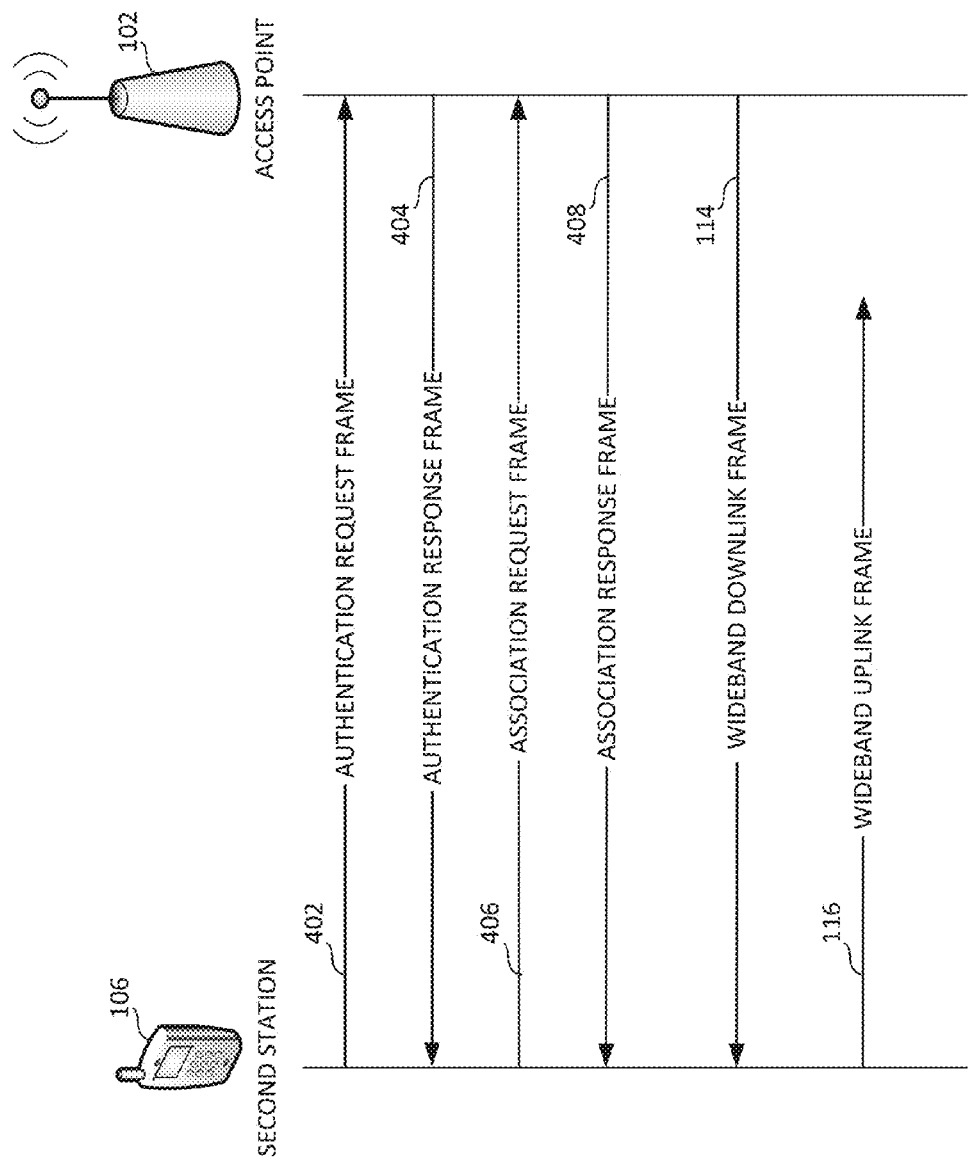
FIG. 4 is a communication flow diagram illustrating the example access point of FIG. 1 awaiting a wideband uplink transmission from the example second station of FIG. 1 in response to a wideband downlink transmission from the access point to the second station.

FIG. 4 is a communication flow diagram illustrating the example access point 102 of FIG. 1 awaiting the example wideband uplink transmission 116 of FIG. 1 from the example second station 106 of FIG. 1 in response to the example wideband downlink transmission 114 of FIG. 1 from the access point 102 to the second station 106. The illustrated example of FIG. 4 applies to instances in which the example access point 102 determines that the second station 106 is not capable of transmitting a narrowband uplink frame to the access point 102 in response to a wideband downlink frame transmitted from the access point 102 to the second station 106.

In the illustrated example of FIG. 4, the second station 106 sends an example authentication request frame 402 to the access point 102. The access point 102 responds to the authentication request frame 402 by sending an example authentication response frame 404 to the second station 106. In the illustrated example, the authentication response frame 404 indicates acceptance of the authentication request. Next, the second station 106 sends an example association request frame 406 to the access point 102. The access point 102 responds to the association request frame 406 by sending an example association response frame 408 to the second station 106. In the illustrated example, the association response frame 408 indicates acceptance of the association request. Although not specifically illustrated in FIG. 4, additional and/or alternative frames may be exchanged between the access point 102 and the second station 106 to facilitate the authentication and/or association processes described above.

In the illustrated example of FIG. 4, following and/or in conjunction with the aforementioned example authentication and/or association processes, the access point 102 determines, based on capability information provided by the second station 106 during and/or prior to the authentication and/or association processes, that the second station 106 is not capable of transmitting a narrowband uplink frame to the access point 102 in response to a wideband downlink frame transmitted from the access point 102 to the second station 106. Based on this determination, the access point 102 sends the example wideband downlink frame 114 to the second station 106. In response to the wideband downlink frame 114 transmitted by the access point 102, the second station 106 attempts to transmit the example wideband uplink frame 116 to the access point 102. As described above in connection with FIG. 1 and further illustrated in FIG. 4, the second station 106 may be unsuccessful in transmitting the example wideband uplink frame 116 to the access point 102 as a result of a disparity between the example wideband coverage area 112 associated with the second station 106 relative to the wideband coverage area 108 associated with the access point 102. In the illustrated example of FIG. 4, the wideband uplink frame 116 may include and/or constitute an acknowledgement frame providing the access point 102 with notification that the example wideband downlink frame 114 was free of errors.

Figure 5:
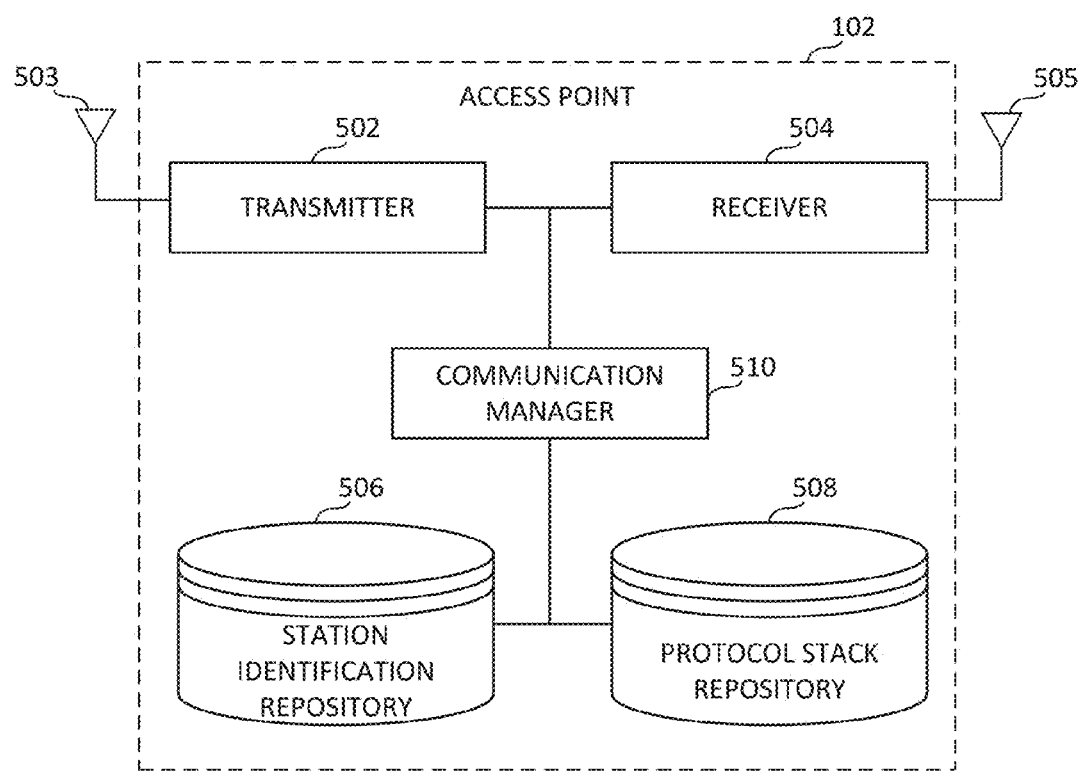
FIG. 5 is a block diagram of the example access point of FIGS. 1-4.

FIG. 5 is a block diagram of the example access point 102 of FIGS. 1-4 constructed in accordance with the teachings of this disclosure to schedule a narrowband uplink transmission from the example first station 104 of FIGS. 1-2 to the access point 102 in response to a station-specific wideband downlink transmission from the access point 102 to the first station 104. In the illustrated example of FIG. 5, the access point 102 includes an example transmitter 502, an example receiver 504, an example station identification repository 506, an example protocol stack repository 508, and an example communication manager 510. However, other example implementations of the access point 102 may include fewer or additional structures to schedule a narrowband uplink transmission from the first station 104 to the access point 102 in response to a station-specific wideband downlink transmission from the access point 102 to the first station 104 in accordance with the teachings of this disclosure.

In the illustrated example of FIG. 5, the example transmitter 502 transmits one or more frames and/or signals to one or more stations such as, for example, the first station 104. For example, in connection with the communication flow diagram of FIG. 2 described above, the transmitter 502 may transmit the example authentication response frame 204, the example association response frame 208, and/or the example station-specific wideband downlink frame 120 to the first station 104. In the illustrated example, the transmitter 502 includes an example antennae 503 to facilitate the transmission of frames and/or signals from the transmitter 502. In some examples, the transmitter 502 modulates the information contained within the frames and/or signals to be transmitted by the transmitter 502.

In the illustrated example of FIG. 5, the example receiver 504 receives one or more frames and/or signals from one or more stations such as, for example, the first station 104. For example, in connection with the communication flow diagram of FIG. 2 described above, the receiver 504 may receive the example authentication request frame 202, the example association request frame 206, and/or the example narrowband uplink frame 122 from the first station 104. In the illustrated example, the receiver 504 includes an example antennae 505 to facilitate the receipt of frames and/or signals from a station such as, for example, the first station 104. In some examples, the receiver 504 demodulates the frames and/or signals that are received by the receiver 504.

In the illustrated example of FIG. 5, the example station identification repository 506 stores information by which one or more stations (e.g., the example first station 104) associated with the access point 102 may be identified. For example, the station identification repository 506 may store a station identifier that uniquely identifies the first station 104. In some examples, the station identifier may be the MAC address associated with the first station 104. In some examples, the station identification repository 506 may store a basic service set (BSS) that includes information identifying each station that has been authenticated and associated with the access point. In some examples, the station identification repository 506 may also store capability information describing the type of device that the station is, as well as the technical capabilities of the station. For example, the station identification repository 506 may store capability information indicating that the first station 104 is able to understand, interpret and/or comply with the scheduling of a narrowband transmission from the first station 104 to the access point 102 in response to a station-specific wideband transmission from the access point 102 to the first station 104. Additionally and/or alternatively, the station identification repository 506 may store capability information indicating that the first station 104 is compliant with one or more versions of the 802.11 body of standards such as, for example, the 802.1 lax standards that are currently under development.

In some examples, the access point 102 receives, obtains, retrieves, identifies and/or derives the information to be stored in the station identification repository 506 from one or more of the authentication and/or association communications exchanged between the first station 104 and the access point 102. For example, the access point 102 may receive, obtain, retrieve, identify and/or derive a station identifier and/or capability information associated with the first station 104 via and/or based on the example authentication request frame 202 and/or the example association request frame 206 of FIG. 2.

The example station identification repository 506 of FIG. 5 may be implemented by any type(s) and/or any number(s) of a storage drive, a storage disk, a flash memory, a read-only memory (ROM), a random-access memory (RAM), a hard disk drive, a compact disk (CD), a digital versatile disk (DVD), a Blu-ray disc, a cache and/or any other storage medium in which information is stored for any duration (e.g., for extended time periods, permanently, brief instances, for temporarily buffering, and/or for caching of the information). The information stored in the example station identification repository 506 may be stored in any file and/or data structure format, organization scheme, and/or arrangement. The information stored in the example station identification repository 506 is accessible to the example communication manager 510 of FIG. 5, and/or, more generally, to the example access point 102 of FIGS. 1-5.

In the illustrated example of FIG. 5, the example protocol stack repository 508 stores one or more example protocol(s) and/or example protocol stack(s) including example computer-implemented instructions to be utilized and/or executed by the access point 102 when communicating with one or more stations such as, for example, the first station 104. For example, the protocol stack repository 508 may store example computer-implemented instructions corresponding to one or more versions of the 802.11 body of standards such as, for example, the 802.11ax standards that are currently under development. In some examples, the protocol stack repository 508 may store computer-implemented instructions to be utilized and/or executed by and/or at the direction of the example communication manager 510 of FIG. 5, and/or, more generally, by the example access point 102 of FIGS. 1-5, when scheduling a narrowband transmission from the first station 104 to the access point 102 in response to a station-specific wideband transmission from the access point 102 to the first station 104. In some examples, the protocol stack repository 508 may also store computer-implemented instructions to be utilized and/or executed by and/or at the direction of the example communication manager 510 of FIG. 5, and/or, more generally, by the example access point 102 of FIGS. 1-5, when exchanging authentication and/or association communications with the first station 104.

In some examples, the protocol(s) and/or protocol stack(s) stored in the protocol stack repository 508 are backwards compatible with earlier generations and/or earlier versions of the stored protocol(s) and/or protocol stack(s). Such backwards compatibility may provide the access point 102 with the ability to communicate with legacy stations such as, for example, the second station 106 of FIGS. 1 and 4 that may be incompatible with aspects of the features and/or functionalities embodied in the current generation and/or current version of the stored protocol(s) and/or protocol stack(s).

The example protocol stack repository 508 of FIG. 5 may be implemented by any type(s) and/or any number(s) of a storage drive, a storage disk, a flash memory, a read-only memory (ROM), a random-access memory (RAM), a hard disk drive, a compact disk (CD), a digital versatile disk (DVD), a Blu-ray disc, a cache and/or any other storage medium in which information is stored for any duration (e.g., for extended time periods, permanently, brief instances, for temporarily buffering, and/or for caching of the information). The information stored in the example protocol stack repository 508 may be stored in any file and/or data structure format, organization scheme, and/or arrangement. The information stored in the example protocol stack repository 508 is accessible to the example communication manager 510 of FIG. 5, and/or, more generally, to the example access point 102 of FIGS. 1-5.

In the illustrated example of FIG. 5, the example communication manager 510 communicates with the example transmitter 502, the example receiver 504, the example station identification repository 506, and the example protocol stack repository 508 to facilitate communications between the access point 102 and one or more stations such as, for example, the first station 104. In some examples, the communication manager 510 may facilitate the authentication of a station with the access point 102. For example, the communication manager 510 may determine, in response to the example authentication request frame 202 of FIG. 2 received by the example receiver 504, whether the example authentication response frame 204 of FIG. 2 should indicate acceptance or rejection of the authentication request transmitted by the first station 104. In some examples, the communication manager 510 may facilitate the association of a station with the access point 102. For example, the communication manager 510 may determine, in response to the example association request frame 206 of FIG. 2 received by the example receiver 504, whether the example association response frame 208 of FIG. 2 should indicate acceptance or rejection of the association request transmitted by the first station 104. The communication manager 510 may cause the example transmitter 502 to transmit the example authentication response frame 204 and/or the example association response frame 208 to a station such as, for example, the first station 104 of FIGS. 1-2.

In some examples, in conjunction with facilitating the authentication and/or authorization of a station with the access point 102, the communication manager 510 may identify and/or derive a station identifier and/or capability information associated with the station. For example, based on the example authentication request frame 202 and/or the example association request frame 206 received by the access point 102 from the first station 104, the communication manager 510 may identify a MAC address that uniquely identifies the first station 104. The communication manager 510 may further identify capability information describing the type of device that the first station 104 is, as well as the technical capabilities of the first station 104. For example, the communication manger 510 may identify capability information indicating that the first station 104 is able to understand, interpret and/or comply with the scheduling of a narrowband transmission from the first station 104 to the access point 102 in response to a station-specific wideband transmission from the access point 102 to the first station 104. Additionally and/or alternatively, the communication manager 510 may identify capability information indicating that the first station 104 is compliant with one or more versions of the 802.11 body of standards such as, for example, the 802.11ax standards that are currently under development. The communication manager 510 causes the station identifier and/or the capability information identified by the communication manger 510 to be stored in the example station identification repository 506.

In some examples, prior to delivering a downlink frame to one or more stations, the communication manger 510 first determines whether the station for which the downlink frame is intended is capable of transmitting a narrowband uplink frame to the access point 102 in response to a wideband downlink frame to be transmitted from the access point 102 to the station. For example, based on the compatibility information stored in the example station identification repository 506, the communication manager 510 may determine that the station (e.g., the second station 106 of FIGS. 1 and 4) is a legacy station that is not capable of transmitting a narrowband uplink frame to the access point 102 in response to a wideband downlink frame transmitted from the access point 102 to the station. In such examples, the communication manager 510 may cause the example transmitter 502 to transmit a wideband downlink frame (e.g., the example wideband downlink frame 114 of FIGS. 1 and 4). In such examples, the wideband downlink frame will not include resource allocation information associated with a narrowband uplink frame. The receiving station (e.g., the example second station 106) may respond to the wideband downlink frame by attempting to transmit a wideband uplink frame (e.g., the example wideband uplink frame 116 of FIGS. 1 and 4) to the access point 102.

In the illustrated example of FIG. 5, if the communication manager 510 instead determines that the station (e.g., the first station 104 of FIGS. 1-3) is capable of transmitting a narrowband uplink frame to the access point 102 in response to a wideband downlink frame transmitted from the access point 102 to the station, the communication manager 510 then determines whether the downlink frame to be transmitted is carrying data that is intended for more than one station that is associated with the access point 102. For example, the communication manager 510 may determine that the downlink frame to be transmitted is carrying data that is intended for two or more stations (e.g., the first station 104 of FIGS. 1 and 3, in addition to another station) associated with the access point 102. In such examples, the communication manager 510 may cause the example transmitter 502 to transmit a wideband downlink frame including a trigger frame (e.g., the example wideband downlink frame including a trigger frame 310 of FIG. 3). In such examples, the wideband downlink frame including the trigger frame will cause any stations associated with the access point 102 to wake up and parse the trigger frame. Once the receiving stations have parsed the trigger frame, one or more of the receiving stations (e.g., the first station 104 of FIGS. 1 and 3) may respond to the wideband downlink frame by transmitting a narrowband uplink frame (e.g., the example narrowband uplink frame 312 of FIG. 3) to the access point 102.

In the illustrated example of FIG. 5, if the communication manager 510 instead determines that the downlink frame to be transmitted is carrying data that is intended for only one station (e.g., the first station 104 of FIGS. 1-2) associated with the access point 102, the communication manager 510 may cause the example transmitter 502 to transmit a station-specific wideband downlink frame including resource allocation information for a narrowband uplink frame (e.g., the example station-specific wideband downlink frame including resource allocation information for a narrowband uplink frame 120 of FIG. 2) to a station. The receiving station (e.g., the first station of FIGS. 1-2) may respond to the station-specific wideband downlink frame by transmitting a narrowband uplink frame (e.g., the example narrowband uplink frame 122 of FIGS. 1-2) to the access point 102.

In the illustrated example of FIG. 5, the communication manager 510 causes the station-specific wideband downlink frame that is to be transmitted to a station (e.g., the first station 104 of FIGS. 1-2) to include a station identifier. In some examples the communication manager 510 obtains, retrieves, identifies and/or derives the station identifier from the example station identification repository 506.

In the illustrated example of FIG. 5, the communication manager 510 further causes the station-specific wideband downlink frame that is to be transmitted to a station (e.g., the first station 104 of FIGS. 1-2) to include resource allocation information associated with a narrowband uplink frame to be transmitted by the station. In some examples, the communication manager 510 specifies a minimum resource unit for the narrowband uplink frame. For example, the communication manager 510 may identify a specific narrowband channel and/or minimum resource unit (e.g., a specific 2.03 MHz uplink sub-channel from within a 20 MHz downlink channel) over which the station is to transmit the narrowband uplink frame. In other examples, the communication manager 510 may alternatively generate a resource selection notification that notifies the station to select a minimum resource unit for the narrowband uplink frame from among a plurality of available minimum resource units corresponding to available sub-channels of the downlink transmission channel. For example, the communication manager 510 may generate a resource selection notification that notifies the station to select an available 2.03 MHz sub-channel for the narrowband uplink frame from within the 20 MHz downlink channel over which the station-specific downlink frame is transmitted to the station.

In some examples, the communication manager 510 may also cause the station-specific wideband downlink frame that is to be transmitted to a station (e.g., the first station 104 of FIGS. 1-2) to include timing information associated with a time by which the station is to transmit the uplink frame to the access point 102. In some examples the communication manager 510 obtains, retrieves, identifies and/or derives the timing information from the example protocol stack repository 508. In some examples, the resource allocation information described above may include the timing information.

In the illustrated example of FIG. 5, one or more of the functions and/or operations of the example transmitter 502, the example receiver 504, the example station identification repository 506, the example protocol stack repository 508, and/or the example communication manager 510 may be performed based on one or more computer-implemented instructions stored in the example protocol stack repository 508.

While an example manner of implementing the example access point 102 of FIGS. 1-4 is illustrated in FIG. 5, one or more of the elements, processes and/or devices illustrated in FIG. 5 may be combined, divided, re-arranged, omitted, eliminated and/or implemented in any other way. Further, the example transmitter 502, the example receiver 504, the example station identification repository 506, the example protocol stack repository 508, the example communication manager 510 and/or, more generally, the example access point 102 of FIG. 5 may be implemented by hardware, software, firmware and/or any combination of hardware, software and/or firmware. Thus, for example, any of the example transmitter 502, the example receiver 504, the example station identification repository 506, the example protocol stack repository 508, the example communication manager 510 and/or, more generally, the example access point 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example transmitter 502, the example receiver 504, the example station identification repository 506, the example protocol stack repository 508, the example communication manager 510 and/or, more generally, the example access point 102 is/are hereby expressly defined to include a tangible computer readable storage device or storage disk such as a memory, a digital versatile disk (DVD), a compact disk (CD), a Blu-ray disk, etc. storing the software and/or firmware. Further still, the example access point 102 of FIG. 5 may include one or more elements, processes and/or devices in addition to, or instead of, those illustrated in FIG. 5, and/or may include more than one of any or all of the illustrated elements, processes and devices.

Figure 6:
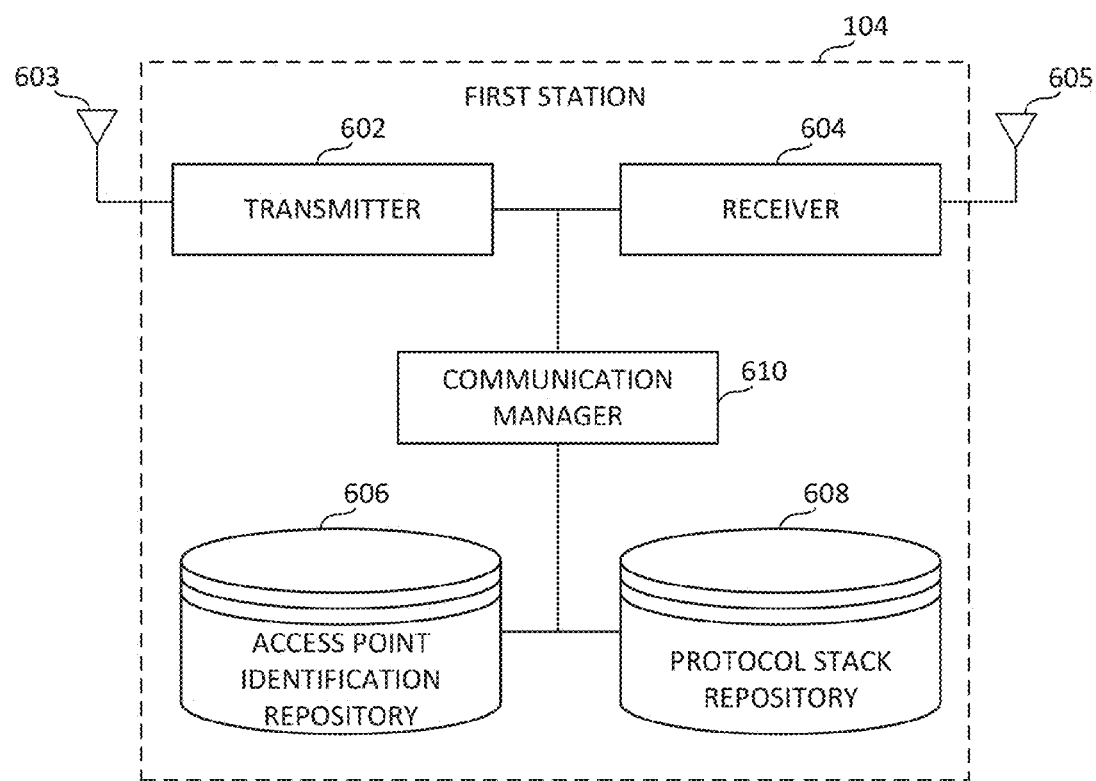
FIG. 6 is a block diagram of the example first station of FIGS. 1-2.

FIG. 6 is a block diagram of the example first station of FIGS. 1-2 constructed in accordance with the teachings of this disclosure to provide a scheduled narrowband uplink transmission to the example access point 102 of FIGS. 1-5 in response to a station-specific wideband downlink transmission from the access point 102 to the first station 104. In the illustrated example of FIG. 6, the first station 104 includes an example transmitter 602, an example receiver 604, an example access point identification repository 606, an example protocol stack repository 608, and an example communication manager 610. However, other example implementations of the first station 104 may include fewer or additional structures to provide a scheduled narrowband uplink transmission to the example access point 102 in response to a station-specific wideband downlink transmission from the access point 102 to the first station 104 in accordance with the teachings of this disclosure.

In the illustrated example of FIG. 6, the example transmitter 602 transmits one or more frames and/or signals to one or more access points such as, for example, the access point 102. For example, in connection with the communication flow diagram of FIG. 2 described above, the transmitter 602 may transmit the example authentication request frame 202, the example association request frame 206, and/or the example narrowband uplink frame 122 to the access point 102. In the illustrated example, the transmitter 602 includes an example antennae 603 to facilitate the transmission of frames and/or signals from the transmitter 602. In some examples, the transmitter 602 modulates the information contained within the frames and/or signals to be transmitted by the transmitter 602.

In the illustrated example of FIG. 6, the example receiver 604 receives one or more frames and/or signals from one or more access points such as, for example, the access point 102. For example, in connection with the communication flow diagram of FIG. 2 described above, the receiver 604 may receive the example authentication response frame 204, the example association response frame 208, and/or the example station-specific wideband downlink frame 120 from the access point 102. In the illustrated example, the receiver 604 includes an example antennae 605 to facilitate the receipt of frames and/or signals from an access point such as, for example, the access point 102. In some examples, the receiver 604 demodulates the frames and/or signals that are received by the receiver 604.

In the illustrated example of FIG. 6, the example access point identification repository 606 stores information by which one or more access points (e.g., the example access point 102) associated with the first station 104 may be identified. For example, the access point identification repository 606 may store a service set identifier (SSID) that identifies the access point 102. In some examples, the access point identification repository 606 may also store capability information describing the type of device that the access point is, as well as the technical capabilities of the access point. For example, the access point identification repository 606 may store capability information indicating that the access point 102 is able to schedule a narrowband transmission from the first station 104 to the access point 102 in response to a station-specific wideband transmission from the access point 102 to the first station 104. Additionally and/or alternatively, the access point identification repository 606 may store capability information indicating that the access point 102 is compliant with one or more versions of the 802.11 body of standards such as, for example, the 802.11ax standards that are currently under development.

In some examples, the first station 104 receives, obtains, retrieves, identifies and/or derives the information to be stored in the access point identification repository 606 from one or more of the authentication and/or association communications exchanged between the first station 104 and the access point 102. For example, the first station 104 may receive, obtain, retrieve, identify and/or derive a SSID and/or capability information associated with the access point 102 via and/or based on the example authentication response frame 204 and/or the example association response frame 208 of FIG. 2.

The example access point identification repository 606 of FIG. 6 may be implemented by any type(s) and/or any number(s) of a storage drive, a storage disk, a flash memory, a read-only memory (ROM), a random-access memory (RAM), a hard disk drive, a compact disk (CD), a digital versatile disk (DVD), a Blu-ray disc, a cache and/or any other storage medium in which information is stored for any duration (e.g., for extended time periods, permanently, brief instances, for temporarily buffering, and/or for caching of the information). The information stored in the example access point identification repository 606 may be stored in any file and/or data structure format, organization scheme, and/or arrangement. The information stored in the example access point identification repository 606 is accessible to the example communication manager 610 of FIG. 6, and/or, more generally, to the example first station 104 of FIGS. 1-2.

In the illustrated example of FIG. 6, the example protocol stack repository 608 stores one or more example protocol(s) and/or example protocol stack(s) including example computer-implemented instructions to be utilized and/or executed by the first station 104 when communicating with one or more access points such as, for example, the access point 102. For example, the protocol stack repository 608 may store example computer-implemented instructions corresponding to one or more versions of the 802.11 body of standards such as, for example, the 802.11ax standards that are currently under development. In some examples, the protocol stack repository 608 may store computer-implemented instructions to be utilized and/or executed by and/or at the direction of the example communication manager 610 of FIG. 6, and/or, more generally, by the example first station 104 of FIGS. 1-2 and 6, when providing a narrowband transmission to the access point 102 in response to a station-specific wideband transmission from the access point 102 to the first station 104. In some examples, the protocol stack repository 608 may also store computer-implemented instructions to be utilized and/or executed by and/or at the direction of the example communication manager 610 of FIG. 6, and/or, more generally, by the example first station 104 of FIGS. 1-2 and 6, when exchanging authentication and/or association communications with the access point 102.

In some examples, the protocol(s) and/or protocol stack(s) stored in the protocol stack repository 608 are backwards compatible with earlier generations and/or earlier versions of the stored protocol(s) and/or protocol stack(s). Such backwards compatibility may provide the first station 104 with the ability to communicate with legacy access points that may be incompatible with aspects of the features and/or functionalities embodied in the current generation and/or current version of the stored protocol(s) and/or protocol stack(s).

The example protocol stack repository 608 of FIG. 6 may be implemented by any type(s) and/or any number(s) of a storage drive, a storage disk, a flash memory, a read-only memory (ROM), a random-access memory (RAM), a hard disk drive, a compact disk (CD), a digital versatile disk (DVD), a Blu-ray disc, a cache and/or any other storage medium in which information is stored for any duration (e.g., for extended time periods, permanently, brief instances, for temporarily buffering, and/or for caching of the information). The information stored in the example protocol stack repository 608 may be stored in any file and/or data structure format, organization scheme, and/or arrangement. The information stored in the example protocol stack repository 608 is accessible to the example communication manager 610 of FIG. 6, and/or, more generally, to the example first station 104 of FIGS. 1-2 and 6.

In the illustrated example of FIG. 6, the example communication manager 610 communicates with the example transmitter 602, the example receiver 604, the example access point identification repository 606, and the example protocol stack repository 608 to facilitate communications between the access point 102 and the first station 104. In some examples, the communication manager 610 may facilitate the authentication of the first station 104 with the access point 102. For example, the communication manager 610 may cause the example transmitter 602 to transmit the example authentication request frame 202 of FIG. 2 to the access point 102, and may further determine whether the example authentication response frame 204 of FIG. 2 received by the example receiver 604 from the access point 102 indicates acceptance or rejection of the authentication request. In some examples, the communication manager 610 may facilitate the association of the first station 104 with the access point 102. For example, the communication manager 610 may cause the example transmitter 602 to transmit the example association request frame 206 of FIG. 2 to the access point 102, and may further determine whether the example association response frame 208 of FIG. 2 received by the example receiver 604 from the access point 102 indicates acceptance or rejection of the association request.

In some examples, in conjunction with facilitating the authentication and/or authorization of the first station 104 with the access point 102, the communication manager 610 may identify and/or derive an access point identifier and/or capability information associated with the access point. For example, based on the example authentication response frame 204 and/or the example association response frame 208 received by the first station 104 from the access point 102, the communication manager 610 may identify a service set identifier (SSID) that identifies the access point 102. The communication manager 610 may further identify capability information describing the type of device that the access point 102 is, as well as the technical capabilities of the access point 102. For example, the communication manger 610 may identify capability information indicating that the access point 102 is able to schedule a narrowband transmission from the first station 104 to the access point 102 in response to a station-specific wideband transmission from the access point 102 to the first station 104. Additionally and/or alternatively, the communication manager 610 may identify capability information indicating that the access point 102 is compliant with one or more versions of the 802.11 body of standards such as, for example, the 802.11ax standards that are currently under development. The communication manager 610 causes the access point identifier and/or the capability information identified by the communication manger 610 to be stored in the example station identification repository 606.

In the illustrated example of FIG. 6, the communication manager 610, based on resource allocation information included within a station-specific wideband downlink frame received by the example receiver 604 from the access point 102, identifies and/or derives a narrowband uplink transmission channel and/or minimum resource unit over which to transmit a narrowband uplink frame to the access point 102. In some examples, the communication manager 610 identifies a narrowband uplink transmission channel and/or minimum resource unit (e.g., a specific 2.03 MHz uplink sub-channel from within a 20 MHz downlink channel) that has already been specified by the resource allocation information included within the station-specific wideband downlink frame. In other examples, the communication manager 610, based on a resource selection notification included within the resource allocation information, selects the narrowband uplink transmission channel and/or minimum resource unit for the narrowband uplink frame from among a plurality of available sub-channels and/or available minimum resource units of the wideband downlink transmission channel over which the station-specific wideband downlink frame was received by the station. In some examples, the communication manager 610 selects the narrowband uplink transmission channel and/or minimum resource unit that provides the most efficient (e.g., the greatest) link performance based on estimates derived by the communication manager 610 from the received station-specific wideband downlink frame 120.

In the illustrated example of FIG. 6, once the communication manager has identified and/or derived the narrowband uplink transmission channel and/or minimum resource unit, the communication manager 610 may cause the transmitter 602 to transmit the example narrowband uplink frame 122 of FIG. 2 to the access point 102.

In the illustrated example of FIG. 6, one or more of the functions and/or operations of the example transmitter 602, the example receiver 604, the example station identification repository 606, the example protocol stack repository 608, and/or the example communication manager 610 may be performed based on one or more computer-implemented instructions stored in the example protocol stack repository 608.

While an example manner of implementing the example first station 104 of FIGS. 1-2 is illustrated in FIG. 6, one or more of the elements, processes and/or devices illustrated in FIG. 6 may be combined, divided, re-arranged, omitted, eliminated and/or implemented in any other way. Further, the example transmitter 602, the example receiver 604, the example access point identification repository 606, the example protocol stack repository 608, the example communication manager 610 and/or, more generally, the example first station 104 of FIG. 6 may be implemented by hardware, software, firmware and/or any combination of hardware, software and/or firmware. Thus, for example, any of the example transmitter 602, the example receiver 604, the example access point identification repository 606, the example protocol stack repository 608, the example communication manager 610 and/or, more generally, the example first station 104 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example transmitter 602, the example receiver 604, the example access point identification repository 606, the example protocol stack repository 608, the example communication manager 610 and/or, more generally, the example first station 104 is/are hereby expressly defined to include a tangible computer readable storage device or storage disk such as a memory, a digital versatile disk (DVD), a compact disk (CD), a Blu-ray disk, etc. storing the software and/or firmware. Further still, the example first station 104 of FIG. 6 may include one or more elements, processes and/or devices in addition to, or instead of, those illustrated in FIG. 6, and/or may include more than one of any or all of the illustrated elements, processes and devices.

Figure 7:
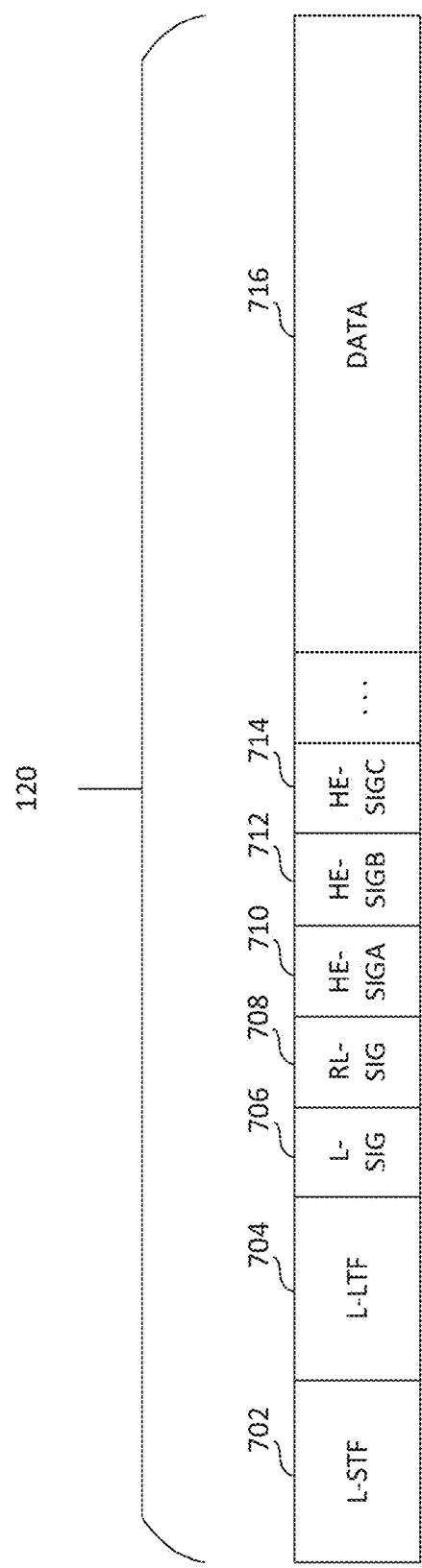
FIG. 7 is an example frame diagram illustrating the example station-specific wideband downlink frame of FIGS. 1-2.

FIG. 7 is an example frame diagram illustrating the example station-specific wideband downlink frame 120 of FIGS. 1-2. In the illustrated example of FIG. 7, the station-specific wideband downlink frame 120 includes example legacy preamble fields such as, for example, an example legacy short training field (L-STF) 702, an example legacy long training field (L-LTF) 704, an example legacy signal field (L-SIG) 706, and an example repeated legacy signal field (RL-SIG) 708. In the illustrated example of FIG. 7, the station-specific wideband downlink frame 120 also includes example high-efficiency preamble fields such as, for example, a first high-efficiency signal field (HE-SIGA) 710, a second high-efficiency signal field (HE-SIGB) 712, and a third high-efficiency signal field (HE-SIGC) 714. In the illustrated example of FIG. 7, the station-specific wideband downlink frame 120 also includes an example data field 716. The example data field 716 may include the MAC address that uniquely identifies the first station 104 to which the example station-specific wideband downlink frame 120 is to be transmitted. In some examples, the example the station-specific wideband downlink frame 120 may include additional, fewer, and/or alternative legacy preamble fields, high-efficiency preamble fields, data fields, and/or other types of fields in relation to the fields described above in connection with FIG. 7. For example, the station-specific wideband downlink frame 120 may further include a high-efficiency short training field (HE-STF) and one or more high-efficiency long training field(s) (HE-LTF).

In the illustrated example of FIG. 7, the station-specific wideband downlink frame 120 may be transmitted from the example access point 102 to the example first station 104 over a wideband channel that may be, for example, a 20 MHz, 40 MHz, 80 MHz or 160 MHz channel. As described above in connection with FIGS. 1-2 and 5, the station-specific wideband downlink frame 120 may include a station identifier that uniquely identifies the first station 104 such as, for example, a MAC address associated with the first station 104. In the illustrated example of FIG. 7, the station identifier may be included within the example data field 716 of the station-specific wideband downlink frame 120 and, more specifically, in a MAC frame of the example data field 716.

As further described above in connection with FIGS. 1-2 and 5, the station-specific wideband downlink frame 120 may also include resource allocation information that identifies, allocates and/or signals a narrowband (e.g., 2.03 MHz) channel resource and/or minimum resource unit to be utilized by the first station 104 when transmitting the example narrowband uplink frame 122 to the access point 102. In some examples, the resource allocation information specifies the narrowband (e.g., 2.03 MHz) channel resource and/or minimum resource unit for the uplink transmission. In such examples, the narrowband channel resource and/or minimum resource unit is specified by the access point 102. Alternatively, the resource allocation information may include a resource selection notification that notifies the first station 104 to select a narrowband (e.g., 2.03 MHz) channel resource and/or minimum resource unit for the uplink transmission from among a plurality of available channel resources and/or available minimum resource units corresponding to available sub-channels of the wideband (e.g., 20 MHz) channel over which the station-specific wideband downlink frame 120 is transmitted. In such examples, the narrowband channel resource and/or minimum resource unit is selected by the first station 104 based on the resource selection notification. In the illustrated example of FIG. 7, the resource allocation information may be included in the form of one or more bits within one or more of the example first high-efficiency signal field (HE-SIGA) 710, the example second high-efficiency signal field (HE-SIGB) 712, the example third high-efficiency signal field (HE-SIGC) 714, and/or a MAC frame of the example data field 716.

As further described above in connection with FIGS. 1-2 and 5, the station-specific wideband downlink frame 120 may also include timing information that identifies, allocates and/or signals a time by which the first station 104 is to transmit the example narrowband uplink frame 122 to the access point 102 in response to the access point 102 transmitting the example station-specific wideband downlink frame 120 to the first station 104. In some examples, the timing information may include parameters from which time can be derived such as, for example, modulation and/or coding parameters associated with the first device 104, the volume of data to be transmitted, and the bandwidth of the transmission. In the illustrated example of FIG. 7, the timing information may be included in the form of one or more bits within one or more of the example first high-efficiency signal field (HE-SIGA) 710, the example second high-efficiency signal field (HE-SIGB) 712, the example third high-efficiency signal field (HE-SIGC) 714, and/or a MAC frame of the example data field 716.

Figure 12:
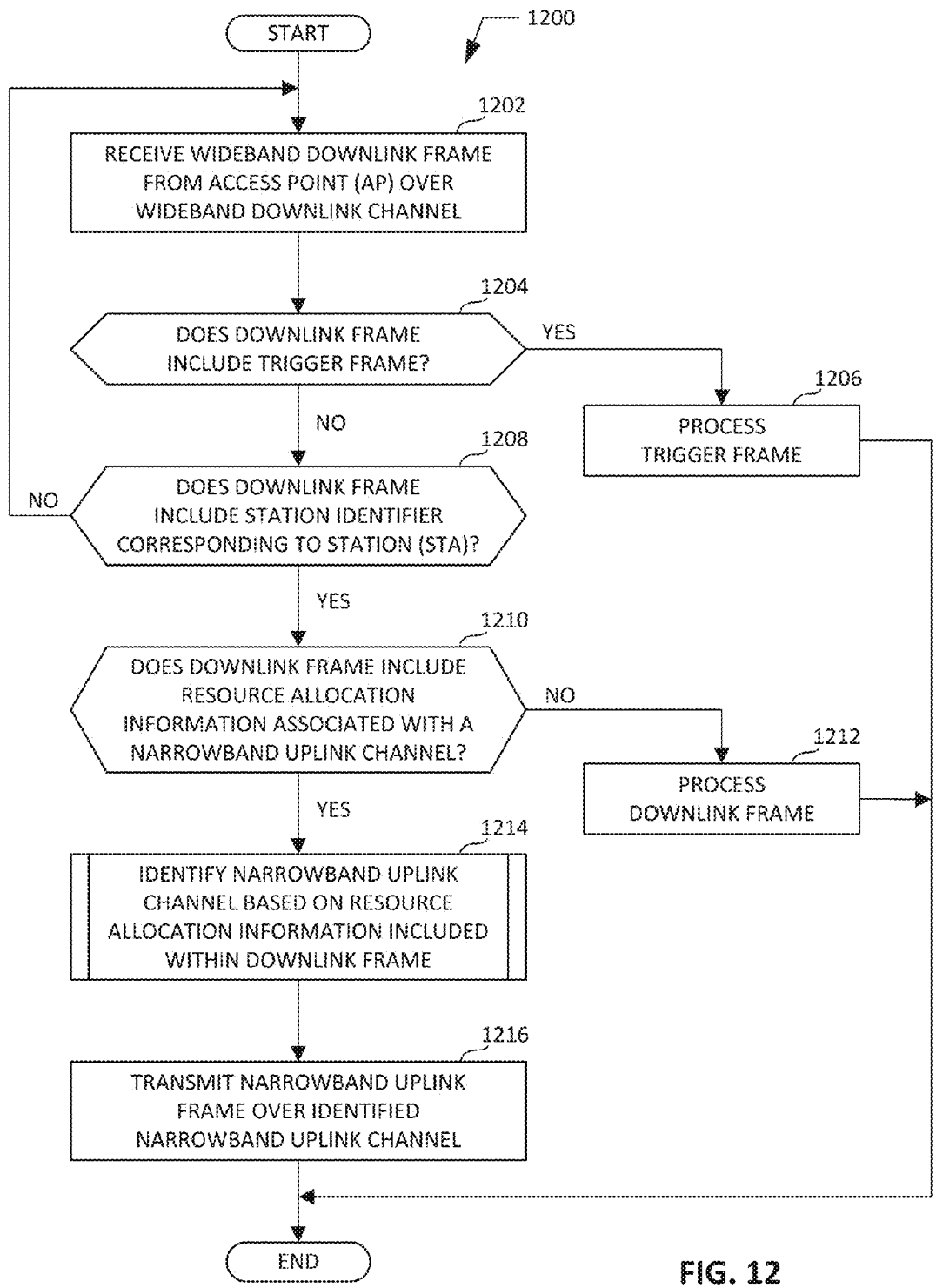
FIG. 12 is a flowchart representative of example machine-readable instructions that may be executed to implement the example first station of FIGS. 1-2 and 6 to provide a scheduled narrowband uplink transmission to the example access point of FIGS. 1-5 in response to a station-specific wideband downlink transmission from the access point to the first station.
Figure 13:
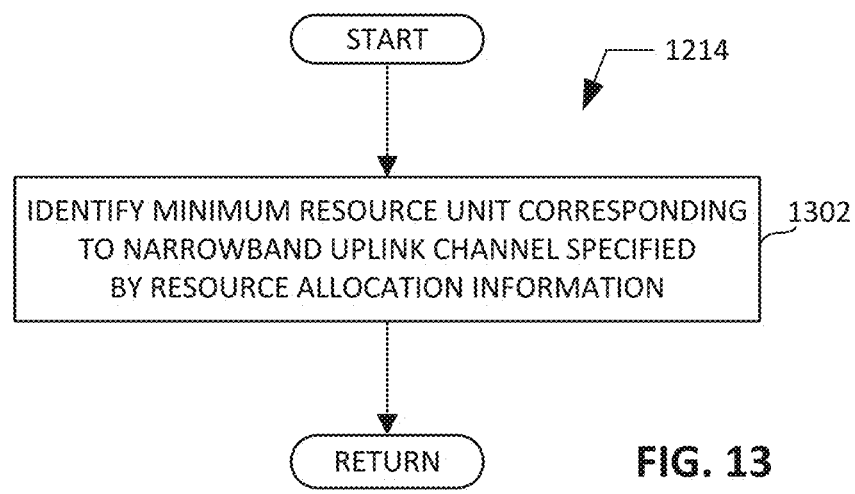
FIG. 13 is a flowchart representative of example machine-readable instructions that may be executed to implement the example first station of FIGS. 1-2 and 6 to identify a minimum resource unit corresponding to a narrowband uplink channel over which the first station is to provide a scheduled narrowband uplink transmission to the example access point of FIGS. 1-5 in response to a station-specific wideband downlink transmission from the access point to the first station.
Figure 14:
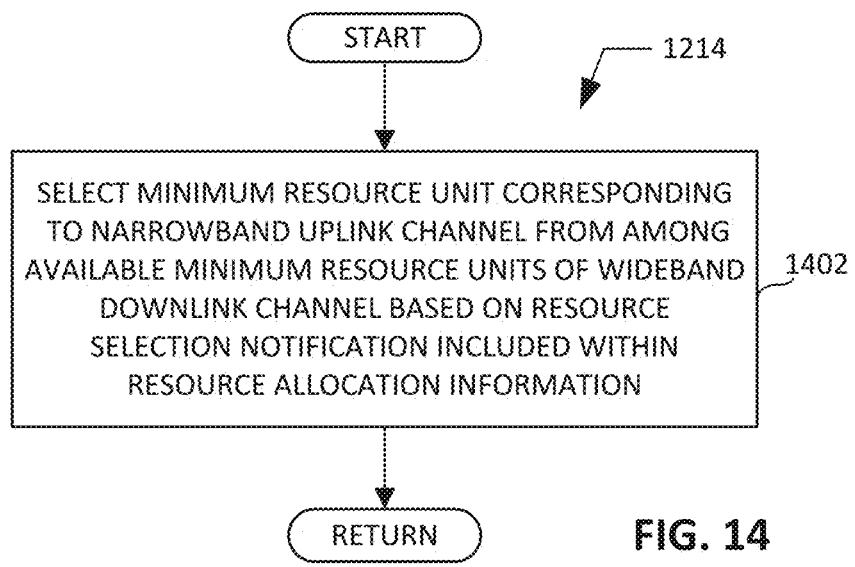
FIG. 14 is a flowchart representative of alternate example machine-readable instructions that may be executed to implement the example station of FIGS. 1-2 and 6 to identify a minimum resource unit corresponding to a narrowband uplink channel over which the first station is to provide a scheduled narrowband uplink transmission to the example access point of FIGS. 1-5 in response to a station-specific wideband downlink transmission from the access point to the first station.

Flowcharts representative of example machine-readable instructions for implementing the example access point 102 of FIGS. 1-5 are shown in FIGS. 8-11. Flowcharts representative of example machine-readable instructions for implementing the example first station 104 of FIGS. 1-2 and 6 are shown in FIGS. 12-14. In these examples, the machine-readable instructions comprise one or more program(s) for execution by a processor such as the processor 1512 shown in the example processor platform 1500 discussed below in connection with FIG. 15 and/or the processor 1612 shown in the example processor platform 1600 discussed below in connection with FIG. 16. The one or more program(s) may be embodied in software stored on a tangible computer readable storage medium such as a CD-ROM, a floppy disk, a hard drive, a digital versatile disk (DVD), a Blu-ray disk, or a memory associated with the processor 1512, 1612, but the entire program(s) and/or parts thereof could alternatively be executed by a device other than the processor 1512, 1612 and/or embodied in firmware or dedicated hardware. Further, although the example program(s) is/are described with reference to the flowcharts illustrated in FIGS. 8-14, many other methods of implementing the example access point 102 and/or the example first station 104 may alternatively be used. For example, the order of execution of the blocks may be changed, and/or some of the blocks described may be changed, eliminated, or combined.

As mentioned above, the example processes of FIGS. 8-14 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8-14 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 8:
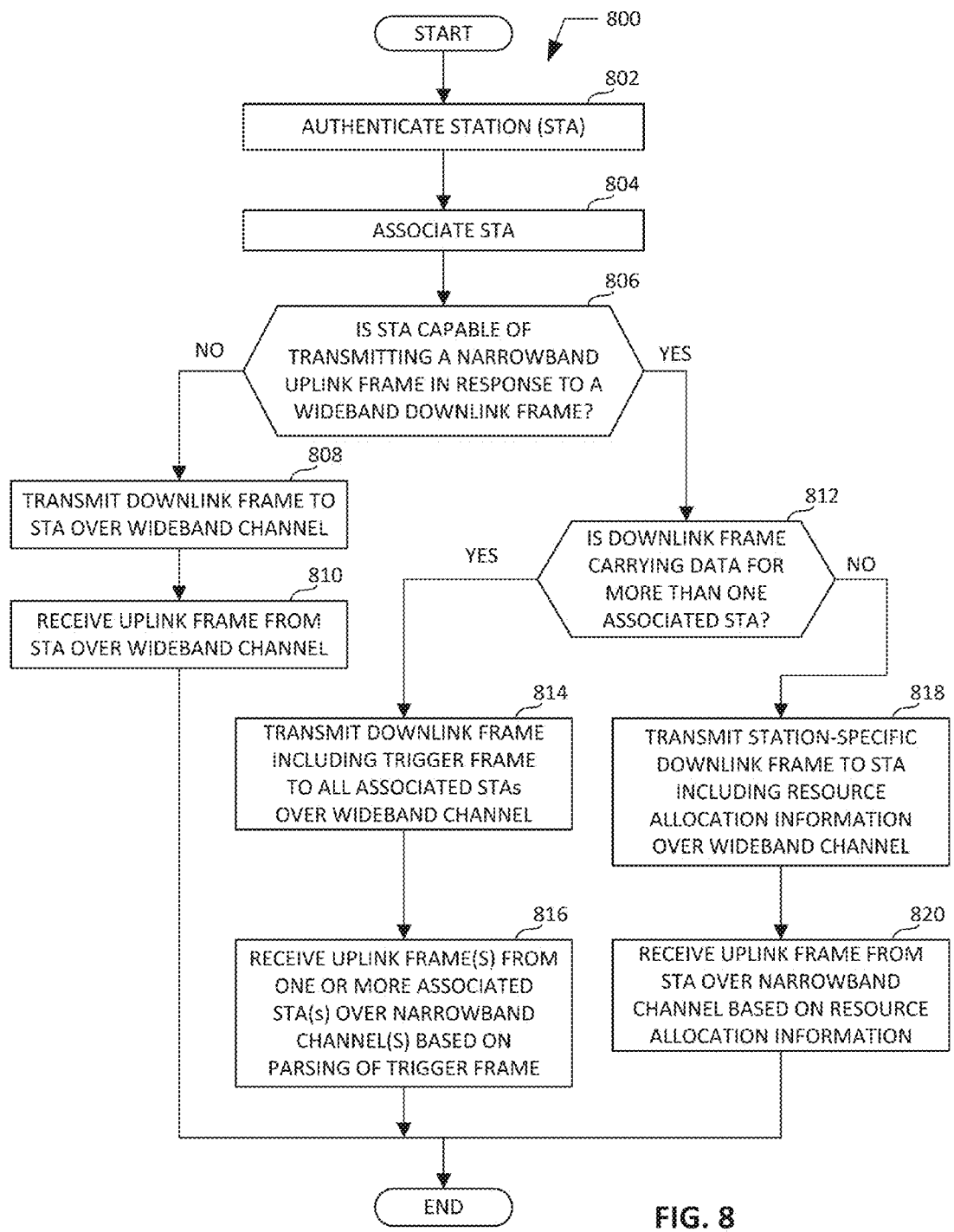
FIG. 8 is a flowchart representative of example machine-readable instructions that may be executed to implement the example access point of FIGS. 1-5 to determine whether to schedule a narrowband uplink transmission by the example first station of FIGS. 1-2 and 6.

FIG. 8 is a flowchart representative of example machine-readable instructions 800 that may be executed by the example access point 102 of FIGS. 1-5 to determine whether to schedule a narrowband uplink transmission by the example first station 104 of FIGS. 1-2 and 6. The example program 800 of FIG. 8 begins when the example communication manager 510 authenticates a station with the access point 102 (block 802). For example, in response to the example authentication request frame 202 of FIG. 2 received by the example receiver 504, the communication manager 510 may cause the example transmitter 502 to transmit the example authentication response frame 204 of FIG. 2 to the first station 104, indicating acceptance of the authentication request.

The example communication manager 510 also associates the authenticated station with the access point 102 (block 804). For example, in response to the example association request frame 206 of FIG. 2 received by the example receiver 504, the communication manager 510 may cause the example transmitter 502 to transmit the example association response frame 208 of FIG. 2 to the first station 104, indicating acceptance of the association request.

The example communication manager 510 determines whether the authenticated and associated station for which a downlink frame is intended is capable of transmitting a narrowband uplink frame to the access point 102 in response to a wideband downlink frame to be transmitted from the access point 102 to the station (block 806). For example, based on compatibility information stored in the example station identification repository 506, the communication manager 510 may determine that the station (e.g., the second station 106 of FIGS. 1 and 4) is a legacy station that is not capable of transmitting a narrowband uplink frame to the access point 102 in response to a wideband downlink frame transmitted from the access point 102 to the station. If the communication manger 510 makes such a determination at block 806, control of the example program 800 proceeds to block 808. If the communication manager 510 instead determines at block 806 that the station (e.g., the first station 104 of FIGS. 1-3) is capable of transmitting a narrowband uplink frame to the access point 102 in response to a wideband downlink frame to be transmitted from the access point 102 to the station, control of the example program 800 proceeds to block 812.

At block 808, the example transmitter 502 transmits a wideband downlink frame (e.g., the example wideband downlink frame 114 of FIGS. 1 and 4) to the station over a wideband transmission channel (block 808). In response to the transmitted wideband downlink frame, the example receiver 504 of the access point 102 receives a wideband uplink frame (e.g., the example wideband uplink frame 116 of FIGS. 1 and 4) from the station (e.g., the second station 106 of FIGS. 1 and 4) over a wideband transmission channel (block 810). Following block 810, the example program 800 ends.

At block 812, the example communication manager 510 determines whether the downlink frame to be transmitted is carrying data that is intended for more than one station associated with the access point 102 (block 812). For example, the communication manager 510 may determine that the downlink frame to be transmitted is carrying data that is intended for two or more stations (e.g., the first station 104 of FIGS. 1 and 3, in addition to another station) associated with the access point 102. If the communication manager 510 makes such a determination at block 812, control of the example program 800 proceeds to block 814. If the communication manager 510 instead determines at block 812 that the downlink frame to be transmitted is carrying data that is intended for only one station (e.g., the first station 104 of FIGS. 1-2) associated with the access point 102, control of the example program 800 proceeds to block 818.

At block 814, the example transmitter 502 transmits a wideband downlink frame including a trigger frame (e.g., the example wideband downlink frame including a trigger frame 310 of FIG. 3) to the stations associated with the access point 102 over a wideband transmission channel (block 814). In response to the transmitted wideband downlink frame including a trigger frame and based on the receiving stations respective parsing of the trigger frame, the example receiver 504 of the access point 102 receives one or more narrowband uplink frame(s) (e.g., the example narrowband uplink frame 312 of FIG. 3) from one or more of the receiving station(s) (e.g., the first station 104 of FIGS. 1 and 3) over one or more narrowband transmission channel(s) (block 816). Following block 816, the example program 800 ends.

At block 818, the example transmitter 502 transmits a station-specific wideband downlink frame including resource allocation information (e.g., the example station-specific wideband downlink frame including resource allocation information 120 of FIGS. 1-2) to the station over a wideband transmission channel (block 818). Based on the resource allocation information included within the station-specific wideband downlink frame, the example receiver 504 of the access point 102 receives a narrowband uplink frame (e.g., the example narrowband uplink frame 122 of FIGS. 1-2) from the receiving station (e.g., the first station 104 of FIGS. 1-2) over the allocated narrowband transmission channel (block 820). Following block 820, the example program 800 ends.

Figure 9:
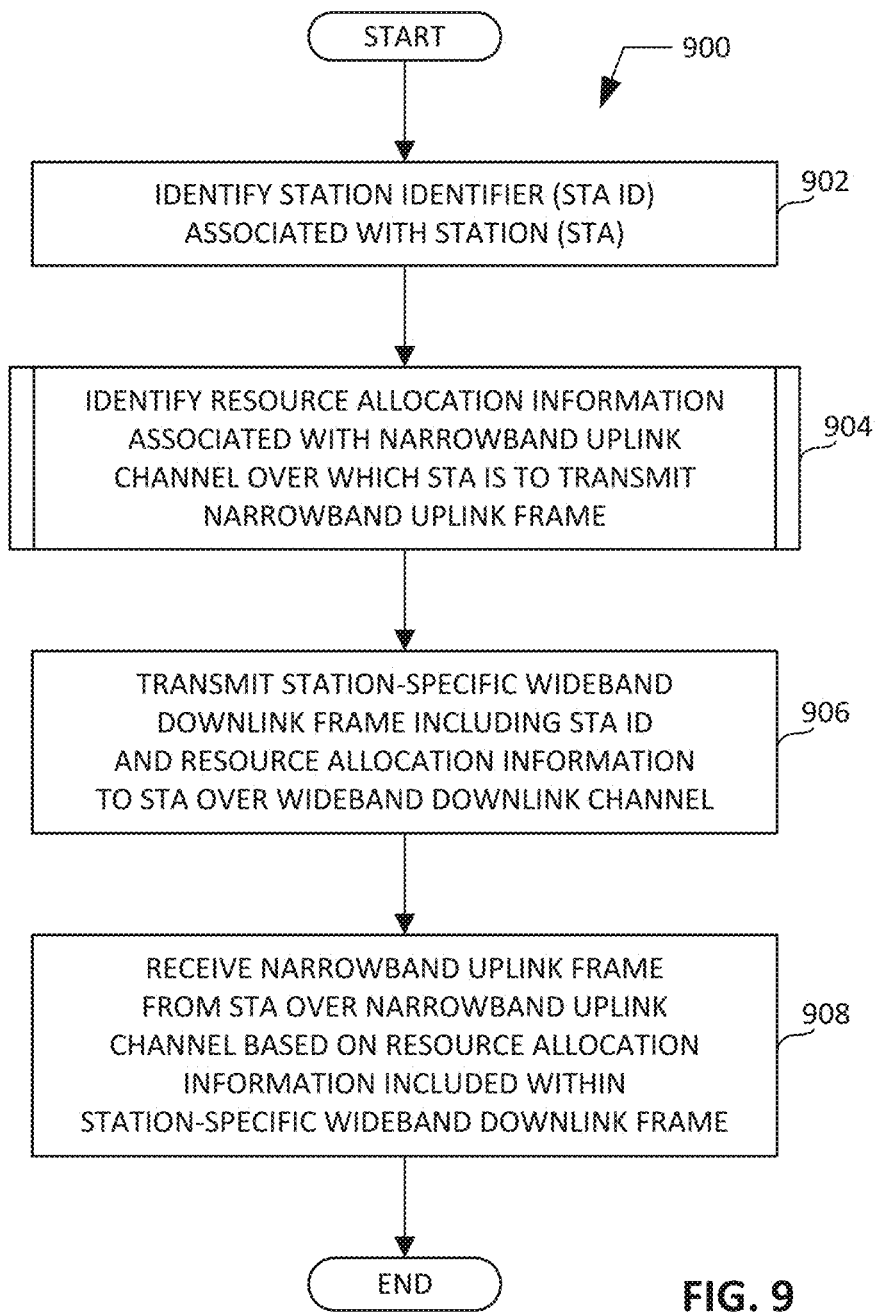
FIG. 9 is a flowchart representative of example machine-readable instructions that may be executed to implement the example access point of FIGS. 1-5 to schedule a narrowband uplink transmission by the example first station of FIGS. 1-2 and 6 in response to a station-specific wideband downlink transmission from the access point to the first station.

FIG. 9 is a flowchart representative of example machine-readable instructions 900 that may be executed by the example access point 102 of FIGS. 1-5 to schedule a narrowband uplink transmission by the example first station 104 of FIGS. 1-2 and 6 in response to a station-specific wideband downlink transmission from the access point 102 to the first station 104. Example operations of block 906 of FIG. 9 may be used to implement block 818 of FIG. 8. Example operations of block 908 of FIG. 9 may be used to implement block 820 of FIG. 8.

The example program 900 of FIG. 9 begins when the example communication manager 510 identifies a station identifier associated with a station for which a downlink frame is intended (block 902). For example, the communication manager 510 may obtain, retrieve, identify and/or derive the station identifier (e.g., the MAC address) associated with the first station 104 from the example station identification repository 506.

The example communication manager 510 also identifies resource allocation information associated with a narrowband uplink transmission channel and/or minimum resource unit over which the station is to transmit a narrowband uplink frame to the access point 102 (block 904). For example, the communication manager 510 may identify resource allocation information associated with the narrowband uplink transmission channel and/or minimum resource unit over which the first station 104 is to transmit the example narrowband uplink frame 122 of FIGS. 1-2 to the access point 102. An example process that may be used to implement block 904 is described in greater detail below in connection with FIG. 10. An alternate example process that may be used to implement block 904 is described in greater detail below in connection with FIG. 11.

The example transmitter 502 transmits a station-specific wideband downlink frame including the identified station identifier and the identified resource allocation information to the station over a wideband downlink transmission channel (block 906). For example, the transmitter 502 may transmit the example station-specific wideband downlink frame including resource allocation information 120 of FIGS. 1-2 to the first station 104 over the wideband downlink transmission channel.

The example receiver 504 receives a narrowband uplink frame from the station over a narrowband uplink channel based on the resource allocation information included within the station-specific wideband downlink frame (block 908). For example, the receiver 504 may receive the narrowband uplink frame 122 of FIGS. 1-2 from the first station 104 over the narrowband uplink channel based on the resource allocation information included within the station-specific wideband downlink frame 120 of FIGS. 1-2. Following block 908, the example program 900 ends.

Figure 10:
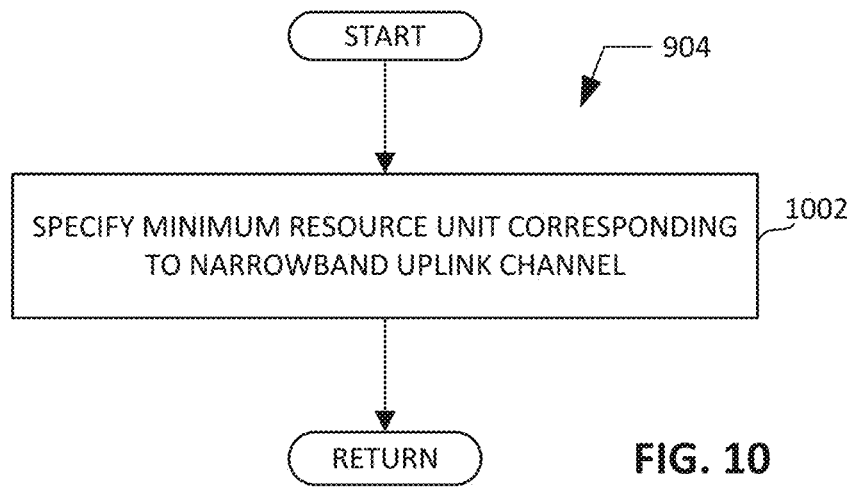
FIG. 10 is a flowchart representative of example machine-readable instructions that may be executed to implement the example access point of FIGS. 1-5 to identify resource allocation information associated with a narrowband uplink channel over which the example first station of FIGS. 1-2 and 6 is to respond to a station-specific wideband downlink transmission from the access point to the first station.

FIG. 10 is a flowchart representative of example machine-readable instructions 904 that may be executed by the example access point 102 of FIGS. 1-5 to identify resource allocation information associated with a narrowband uplink transmission channel and/or minimum resource unit over which the example first station 104 of FIGS. 1-2 and 6 is to respond to a station-specific wideband downlink transmission from the access point 102 to the first station 104. Example operations of block 1002 of FIG. 10 may be used to implement block 904 of FIG. 9.

The example program 904 of FIG. 10 begins when the communication manager 510 specifies a minimum resource unit corresponding to the narrowband uplink transmission channel (block 1002). For example, the communication manager 510 may specify a narrowband uplink transmission channel and/or minimum resource unit (e.g., a specific 2.03 MHz uplink sub-channel from within a 20 MHz downlink channel) over which the first station 104 is to transmit the example narrowband uplink frame 122 of FIGS. 1-2. Following block 1002, the example program 904 of FIG. 10 ends and control returns to a calling function or process such as the example program 900 of FIG. 9.

Figure 11:
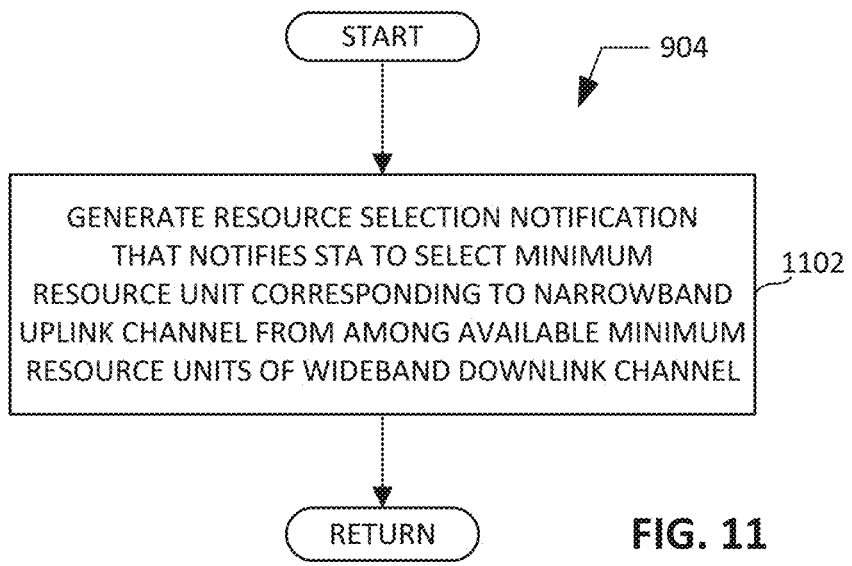
FIG. 11 is a flowchart representative of alternate example machine-readable instructions that may be executed to implement the example access point of FIGS. 1-5 to identify resource allocation information associated with a narrowband uplink channel over which the example first station of FIGS. 1-2 and 6 is to respond to a station-specific wideband downlink transmission from the access point to the first station.

FIG. 11 is a flowchart representative of alternate example machine-readable instructions 904 that may be executed by the example access point 102 of FIGS. 1-5 to identify resource allocation information associated with a narrowband uplink transmission channel and/or minimum resource unit over which the example first station 104 of FIGS. 1-2 and 6 is to respond to a station-specific wideband downlink transmission from the access point 102 to the first station 104. Example operations of block 1102 of FIG. 11 may be used to implement block 904 of FIG. 9.

The example program 904 of FIG. 11 begins when the communication manager 510 generates a resource selection notification that notifies the station to select a minimum resource unit corresponding to a narrowband uplink transmission channel from among a plurality of available sub-channels and/or available minimum resource units of the wideband downlink transmission channel over which a downlink frame is to be transmitted (block 1102). For example, the communication manager 510 may generate a resource selection notification that notifies the first station 104 to select, from within the 20 MHz downlink transmission channel over which the example station-specific downlink frame 120 of FIGS. 1-2 is to be transmitted to the first station 104, an available 2.03 MHz sub-channel and/or minimum resource unit for the narrowband uplink transmission channel over which the example narrowband uplink frame 122 of FIGS. 1-2 is to be transmitted. Following block 1102, the example program 904 of FIG. 11 ends and control returns to a calling function or process such as the example program 900 of FIG. 9.

FIG. 12 is a flowchart representative of example machine-readable instructions 1200 that may be executed by the example first station 104 of FIGS. 1-2 and 6 to provide a scheduled narrowband uplink transmission to the example access point 102 of FIGS. 1-5 in response to a station-specific wideband downlink transmission from the access point 102 to the first station 104. The example program 1200 of FIG. 12 begins when the example receiver 604 receives a wideband downlink frame from the access point 102 over a wideband downlink transmission channel (block 1202). For example, the receiver 604 may receive the example station-specific wideband downlink frame including resource allocation information 120 of FIGS. 1-2, the example wideband downlink frame including trigger frame 310 of FIG. 3, or the example wideband downlink frame 114 of FIGS. 1 and 4.

The example communication manager 610 determines whether the received downlink frame includes a trigger frame (block 1204). For example, the communication manager 610 may determine that the example wideband downlink frame including trigger frame 310 of FIG. 3 includes a trigger frame. As another example, the communication manager 610 may determine that the example station-specific wideband downlink frame including resource allocation information 120 of FIGS. 1-2 does not include a trigger frame. If the communication manager 610 determines at block 1204 that the downlink frame includes a trigger frame, control of the example program 1200 proceeds to block 1206. If the communication manager 610 instead determines at block 1204 that the downlink frame does not include a trigger frame, control of the example program 1200 proceeds to block 1208.

At block 1206, the communication manager 610 processes the trigger frame included in the received downlink frame (block 1206). For example, in response to receiving the example wideband downlink frame including trigger frame 310 of FIG. 3, the communication manager 610 may cause the first station 104 to wake up and parse the trigger frame to determine what form of a response, if any, the first station 104 should and/or may transmit to the access point 102. Following block 1206, the example program 1200 ends.

At block 1208, the example communication manager 610 determines whether the received downlink frame includes a station identifier that corresponds to and/or matches that of the first station 104 (block 1208). For example, the communication manager 610 may determine whether a MAC address included in the example station-specific wideband downlink frame including resource allocation information 120 of FIGS. 1-2 corresponds to and/or matches the MAC address associated with the first station 104. If the communication manager 610 determines at block 1208 that the downlink frame includes a station identifier that corresponds to the first station 104, control of the example program 1200 proceeds to block 1210. If the communication manager 610 instead determines at block 1208 that the downlink frame does not include a station identifier that corresponds to the first station 104, the first station 104 thereafter ignores the content of the received downlink frame, and control of the example program 1200 returns to the beginning of the program 1200.

At block 1210, the example communication manager 610 determines whether the received downlink frame includes resource allocation information associated with a narrowband uplink channel (block 1210). For example, the communication manager 610 may determine that the example station-specific wideband downlink frame including resource allocation information 120 of FIGS. 1-2 includes resource allocation information associated with a narrowband uplink channel. If the communication manager 610 determines at block 1210 that the downlink frame does not include resource allocation information associated with a narrowband uplink channel, control of the example program 1200 proceeds to block 1212. If the communication manager 610 instead determines at block 1210 that the downlink frame includes resource allocation information associated with a narrowband uplink channel, control of the example program 1200 proceeds to block 1214.

At block 1212, the example communication manager 610 processes the received downlink frame (block 1212). For example, in response to receiving a station-specific wideband downlink frame that does not include resource allocation information associated with a narrowband uplink channel, the communication manager 610 may cause the first station 104 to transmit a wideband uplink frame to the access point 102 over a wideband uplink channel. Following block 1212, the example program 1200 ends.

At block 1214, the example communication manager 610 identifies a narrowband uplink transmission channel based on the resource allocation information included within the station-specific wideband downlink frame (block 1214). For example, the communication manager 610 may obtain, retrieve, identify and/or derive a narrowband uplink transmission channel over which to transmit the example narrowband uplink frame 122 of FIGS. 1-2 based on the resource allocation information included within the example station-specific wideband downlink frame 120 of FIGS. 1-2. An example process that may be used to implement block 1214 is described in greater detail below in connection with FIG. 13. An alternate example process that may be used to implement block 1214 is described in greater detail below in connection with FIG. 14.

The example transmitter 602 transmits a narrowband uplink frame over the identified narrowband uplink transmission channel (block 1216). For example, the transmitter 602 may transmit the example narrowband uplink frame 122 of FIGS. 1-2 over the narrowband uplink transmission channel identified by the example communication manager 610. Following block 1216, the example program 1200 ends.

FIG. 13 is a flowchart representative of example machine-readable instructions 1214 that may be executed by the example first station 104 of FIGS. 1-2 and 6 to identify a minimum resource unit corresponding to a narrowband uplink channel over which the first station 104 is to provide a scheduled narrowband uplink transmission to the example access point 102 of FIGS. 1-5 in response to a station-specific wideband downlink transmission from the access point 102 to the first station 104. Example operations of block 1302 of FIG. 13 may be used to implement block 1214 of FIG. 12.

The example program 1214 of FIG. 13 begins when the communication manager 610 identifies a minimum resource unit corresponding to the narrowband uplink transmission channel as specified by the resource allocation information (block 1302). For example, the communication manager 610 may identify a narrowband uplink transmission channel and/or minimum resource unit (e.g., a specific 2.03 MHz uplink sub-channel from within a 20 MHz downlink channel) over which the first station 104 is to transmit the example narrowband uplink frame 122 of FIGS. 1-2 as specified by the resource allocation information included within the example station-specific wideband downlink frame 120 of FIGS. 1-2. Following block 1302, the example program 1214 of FIG. 13 ends and control returns to a calling function or process such as the example program 1200 of FIG. 12.

FIG. 14 is a flowchart representative of alternate example machine-readable instructions 1214 that may be executed by the example station 104 of FIGS. 1-2 and 6 to identify a minimum resource unit corresponding to a narrowband uplink channel over which the first station 104 is to provide a scheduled narrowband uplink transmission to the example access point 102 of FIGS. 1-5 in response to a station-specific wideband downlink transmission from the access point 102 to the first station 104. Example operations of block 1402 of FIG. 14 may be used to implement block 1214 of FIG. 12.

The example program 1214 of FIG. 14 begins when the communication manager 610 based on a resource selection notification included within the resource allocation information, selects a narrowband uplink transmission channel and/or minimum resource unit for the narrowband uplink frame from among a plurality of available sub-channels and/or available minimum resource units of the wideband downlink transmission channel over which the station-specific wideband downlink frame was received by the first station 104 (block 1402). For example, based on a resource selection notification included within the resource allocation information, the communication manager 610 may select, from within the 20 MHz wideband downlink transmission channel over which the example station-specific wideband downlink frame 120 of FIGS. 1-2 has been received by the first station 104, an available 2.03 MHz sub-channel and/or minimum resource unit for the narrowband uplink transmission channel over which the example narrowband uplink frame 122 of FIGS. 1-2 is to be transmitted. In some examples, the communication manager 610 selects the narrowband uplink transmission channel and/or minimum resource unit that provides the most efficient (e.g., the greatest) link performance based on estimates derived by the communication manager 610 from the example station-specific wideband downlink frame 120 of FIGS. 1-2. Following block 1402, the example program 1214 of FIG. 14 ends and control returns to a calling function or process such as the example program 1200 of FIG. 12.

Figure 15:
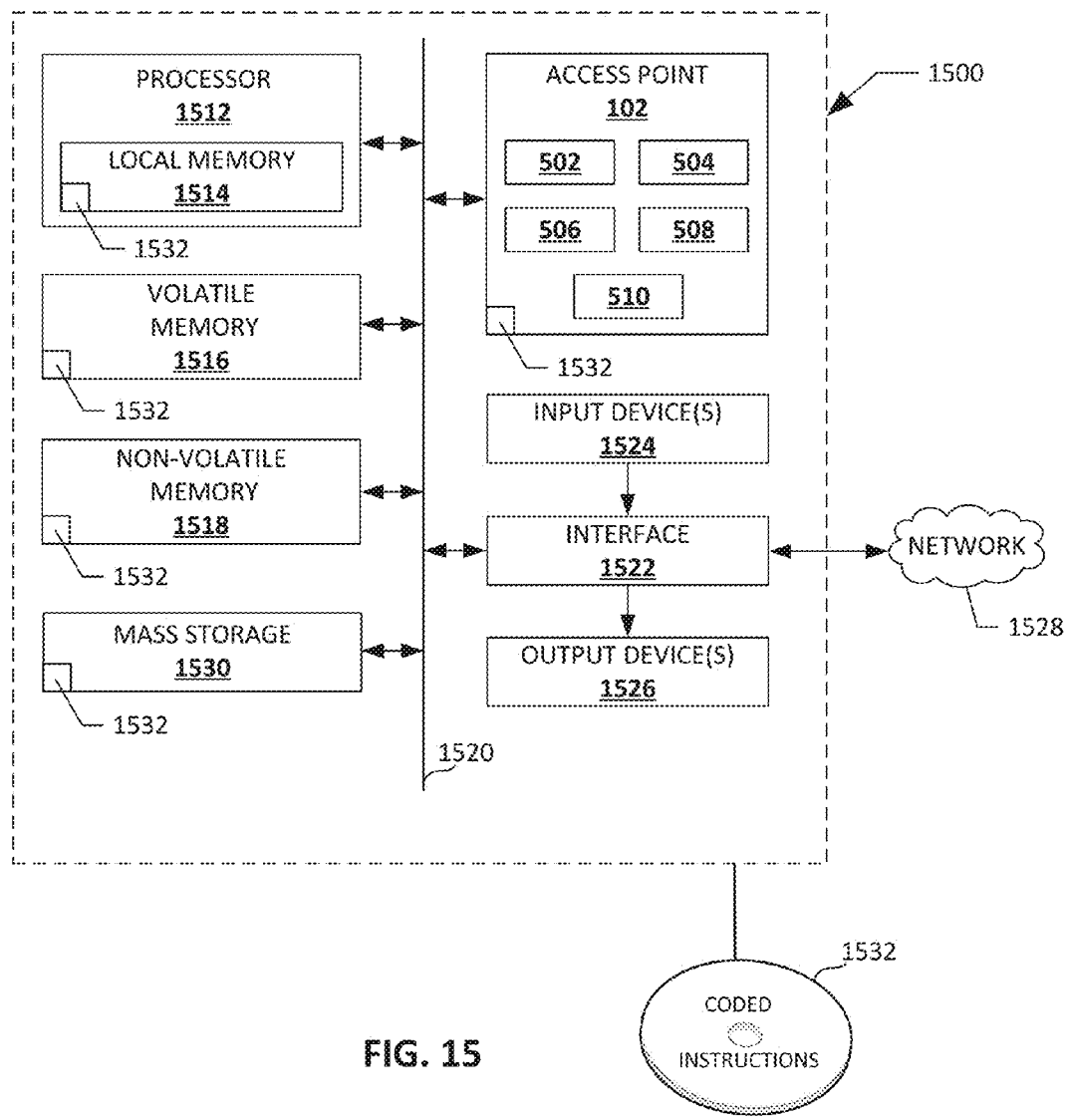
FIG. 15 is an example processor platform capable of executing the example instructions of FIGS. 8-11 to implement the example access point of FIGS. 1-5.

FIG. 15 is a block diagram of an example processor platform 1500 capable of executing the example instructions of FIGS. 8-11 to implement the example access point 102 of FIGS. 1-5. The processor platform 1500 can be, for example, a server, a personal computer, a router, or any other type of computing device. The processor platform 1500 includes the example access point 102.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The example processor 1512 includes a local memory 1514 (e.g., a cache). The processor 1512 of the illustrated example is in communication with a main memory including a volatile memory 1516 and a non-volatile memory 1518 via a bus 1520. The volatile memory 1516 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1518 may be implemented by flash memory and/or any other desired type of memory device. Access to the main memory 1516, 1518 is controlled by a memory controller.

The processor platform 1500 of the illustrated example also includes an interface circuit 1522. The interface circuit 1522 may be implemented by any type of interface standard, such as an Ethernet interface, a universal serial bus (USB), and/or a PCI express interface.

In the illustrated example, one or more input devices 1524 are connected to the interface circuit 1522. The input device(s) 1524 permit(s) a user to enter data and commands into the processor 1512. The input device(s) can be implemented by, for example, a keyboard, a mouse, a touchscreen, a track-pad, a trackball, isopoint and/or a voice recognition system.

One or more output devices 1526 are also connected to the interface circuit 1522 of the illustrated example. The output devices 1526 can be implemented, for example, by display devices (e.g., a liquid crystal display, a cathode ray tube display (CRT), a touchscreen, a printer and/or speakers). The interface circuit 1522 of the illustrated example, thus, typically includes a graphics driver card, a graphics driver chip or a graphics driver processor.

The interface circuit 1522 of the illustrated example also includes a communication device such as a transmitter, a receiver, a transceiver, a modem and/or network interface card to facilitate exchange of data with external machines (e.g., computing devices of any kind) via a network 1528 (e.g., an Ethernet connection, a digital subscriber line (DSL), a telephone line, coaxial cable, a cellular telephone system, etc.).

The processor platform 1500 of the illustrated example also includes one or more mass storage devices 1530 for storing software and/or data. Examples of such mass storage devices 1530 include floppy disk drives, hard drive disks, compact disk drives, Blu-ray disk drives, RAID systems, and digital versatile disk (DVD) drives.

Coded instructions 1532 implementing the machine-readable instructions of FIGS. 8-11 may be stored in the local memory 1514, in the volatile memory 1516, in the non-volatile memory 1518, in the mass storage device 1530, in the access point 102, and/or on a removable tangible computer readable storage medium such as a CD or DVD.

Figure 16:
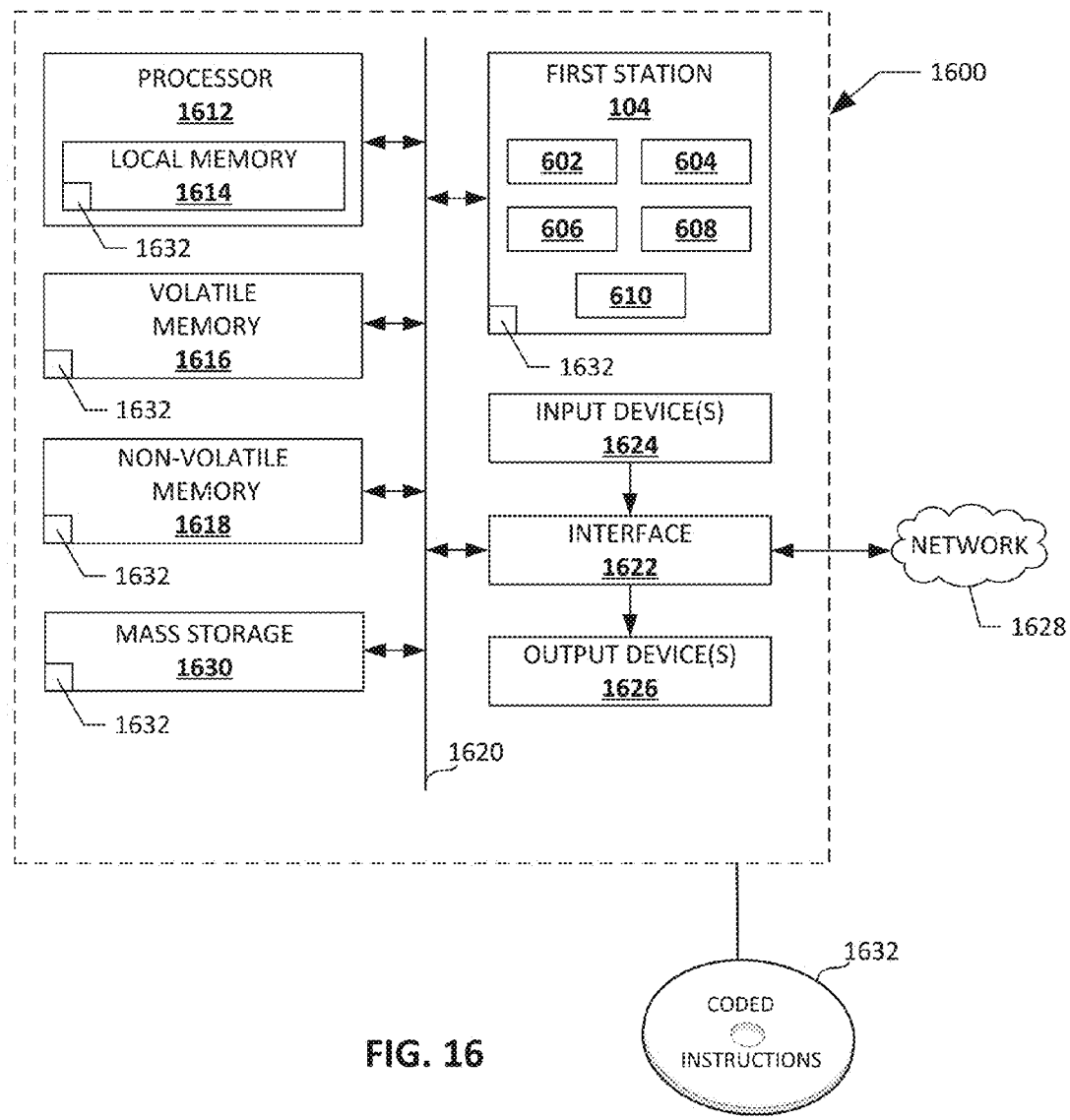
FIG. 16 is an example processor platform capable of executing the example instructions of FIGS. 12-14 to implement the example first station of FIGS. 1-2 and 6.

FIG. 16 is a block diagram of an example processor platform 1600 capable of executing the example instructions of FIGS. 12-14 to implement the example first station 104 of FIGS. 1-2 and 6. The processor platform 1600 can be, for example, a personal computer, a tablet, a smartphone, or any other type of computing device. The processor platform 1600 includes the example first station 104.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer.

The example processor 1612 includes a local memory 1614 (e.g., a cache). The processor 1612 of the illustrated example is in communication with a main memory including a volatile memory 1616 and a non-volatile memory 1618 via a bus 1620. The volatile memory 1616 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1618 may be implemented by flash memory and/or any other desired type of memory device. Access to the main memory 1616, 1618 is controlled by a memory controller.

The processor platform 1600 of the illustrated example also includes an interface circuit 1622. The interface circuit 1622 may be implemented by any type of interface standard, such as an Ethernet interface, a universal serial bus (USB), and/or a PCI express interface.

In the illustrated example, one or more input devices 1624 are connected to the interface circuit 1622. The input device(s) 1624 permit(s) a user to enter data and commands into the processor 1612. The input device(s) can be implemented by, for example, a keyboard, a mouse, a touchscreen, a track-pad, a trackball, isopoint and/or a voice recognition system.

One or more output devices 1626 are also connected to the interface circuit 1622 of the illustrated example. The output devices 1626 can be implemented, for example, by display devices (e.g., a liquid crystal display, a cathode ray tube display (CRT), a touchscreen, a printer and/or speakers). The interface circuit 1622 of the illustrated example, thus, typically includes a graphics driver card, a graphics driver chip or a graphics driver processor.

The interface circuit 1622 of the illustrated example also includes a communication device such as a transmitter, a receiver, a transceiver, a modem and/or network interface card to facilitate exchange of data with external machines (e.g., computing devices of any kind) via a network 1628 (e.g., an Ethernet connection, a digital subscriber line (DSL), a telephone line, coaxial cable, a cellular telephone system, etc.).

The processor platform 1600 of the illustrated example also includes one or more mass storage devices 1630 for storing software and/or data. Examples of such mass storage devices 1630 include floppy disk drives, hard drive disks, compact disk drives, Blu-ray disk drives, RAID systems, and digital versatile disk (DVD) drives.

Coded instructions 1632 implementing the machine-readable instructions of FIGS. 12-14 may be stored in the local memory 1614, in the volatile memory 1616, in the non-volatile memory 1618, in the mass storage device 1630, in the first station 104, and/or on a removable tangible computer readable storage medium such as a CD or DVD.

From the foregoing, it will be appreciated that the disclosed methods and apparatus advantageously reduce and/or eliminate link budget imbalances originating from discrepancies in wideband coverage areas that may exist between an access point and its associated stations.

From the foregoing, it will also be appreciated that the disclosed methods and apparatus provide an advantage over the OFDMA trigger frame approach described above in instances where the downlink frame is carrying data that is intended for only one station. For example, because the disclosed station-specific wideband downlink frame is targeted to only a single station, the targeted station is able to transmit a narrowband uplink frame to an associated access point without other stations associated with the access point having to wake up and/or parse a trigger frame, as would occur under the OFDMA protocol. As a result, the disclosed station-specific wideband downlink frame provides a reduction in network overhead relative to the network overhead associated with use of the OFDMA protocol. Network throughput is also improved, and power is saved as a result of eliminating the need for other stations associated with the access point having to awake and parse a trigger frame.

Examples may include subject matter such as a method, means for performing acts of the method, at least one machine-readable medium including instructions that, when performed by a machine cause the machine to performs acts of the method, or of an apparatus or system to schedule a narrowband response to wideband data according to embodiments and examples described herein. Examples may also include subject matter such as a method, means for performing acts of the method, at least one machine-readable medium including instructions that, when performed by a machine cause the machine to performs acts of the method, or of an apparatus or system to provide a narrowband response to wideband data according to embodiments and examples described herein.

Example 1 is a wireless access point to schedule a narrowband response to wideband data. The wireless access point of Example 1 comprises a communication manager to identify (a) a station identifier associated with a wireless station and (b) resource allocation information associated with an uplink transmission channel over which the wireless station is to transmit an uplink frame. The wireless access point of Example 1 further includes a transmitter to transmit a station-specific downlink frame from the wireless access point to the wireless station over a downlink transmission channel. The downlink transmission channel has an associated downlink bandwidth. The station-specific downlink frame includes the station identifier and the resource allocation information. The wireless access point of Example 1 further includes a receiver to, based on the resource allocation information, receive the uplink frame at the wireless access point from the wireless station over the uplink transmission channel. The uplink transmission channel has an associated uplink bandwidth that is narrower than the downlink bandwidth of the downlink transmission channel. The uplink transmission channel is a sub-channel of the downlink transmission channel.

Example 2 includes the subject matter of Example 1, wherein the communication manager is further to specify a minimum resource unit for the uplink frame. The minimum resource unit corresponds to the uplink transmission channel. The resource allocation information is indicative of the minimum resource unit.

Example 3 includes the subject matter of Example 1, wherein the communication manager is further to generate a resource selection notification that notifies the wireless station to select a minimum resource unit for the uplink frame from among a plurality of available minimum resource units corresponding to available sub-channels of the downlink transmission channel. The minimum resource unit corresponds to the uplink transmission channel. The resource allocation information includes the resource selection notification.

Example 4 includes the subject matter of Examples 1-3, wherein the downlink bandwidth is 20 MHz.

Example 5 includes the subject matter of Examples 1-4, wherein the uplink bandwidth is about 2.03 MHz.

Example 6 includes the subject matter of Examples 1-5, wherein the uplink frame includes an acknowledgement frame.

Example 7 includes the subject matter of Examples 1-6, wherein the station-specific downlink frame further includes timing information associated with a time by which the wireless station is to transmit the uplink frame to the wireless access point.

Example 8 is a method to schedule a narrowband response to wideband data. The method of Example 8 comprises identifying a station identifier associated with a wireless station. The method of Example 8 further includes identifying resource allocation information associated with an uplink transmission channel over which the wireless station is to transmit an uplink frame. The method of Example 8 further includes transmitting a station-specific downlink frame from a wireless access point to the wireless station over a downlink transmission channel. The downlink transmission channel has an associated downlink bandwidth. The station-specific downlink frame includes the station identifier and the resource allocation information. The method of Example 8 further includes receiving, based on the resource allocation information, the uplink frame at the wireless access point from the wireless station over the uplink transmission channel. The uplink transmission channel has an associated uplink bandwidth that is narrower than the downlink bandwidth of the downlink transmission channel. The uplink transmission channel is a sub-channel of the downlink transmission channel.

Example 9 includes the subject matter of Example 8, wherein identifying the resource allocation information includes specifying a minimum resource unit for the uplink frame. The minimum resource unit corresponds to the uplink transmission channel. The resource allocation information is indicative of the minimum resource unit.

Example 10 includes the subject matter of Example 8, wherein identifying the resource allocation information includes generating a resource selection notification that notifies the wireless station to select a minimum resource unit for the uplink frame from among a plurality of available minimum resource units corresponding to available sub-channels of the downlink transmission channel. The minimum resource unit corresponds to the uplink transmission channel. The resource allocation information including the resource selection notification.

Example 11 includes the subject matter of Examples 8-10, wherein the downlink bandwidth is 20 MHz.

Example 12 includes the subject matter of Examples 8-11, wherein the uplink bandwidth is about 2.03 MHz.

Example 13 includes the subject matter of Examples 8-12, wherein the uplink frame includes an acknowledgement frame.

Example 14 includes the subject matter of Examples 8-13, wherein the station-specific downlink frame further includes timing information associated with a time by which the wireless station is to transmit the uplink frame to the wireless access point.

Example 15 is a tangible machine-readable storage medium comprising instructions that, when executed, cause a wireless access point to identify a station identifier associated with a wireless station. The instructions of Example 15, when executed, cause the wireless access point to identify resource allocation information associated with an uplink transmission channel over which the wireless station is to transmit an uplink frame. The instructions of Example 15, when executed, cause the wireless access point to transmit a station-specific downlink frame from the wireless access point to the wireless station over a downlink transmission channel. The downlink transmission channel has an associated downlink bandwidth. The station-specific downlink frame includes the station identifier and the resource allocation information. The instructions of Example 15, when executed, cause the wireless access point to, based on the resource allocation information, receive the uplink frame at the wireless access point from the wireless station over the uplink transmission channel. The uplink transmission channel has an associated uplink bandwidth that is narrower than the downlink bandwidth of the downlink transmission channel. The uplink transmission channel is a sub-channel of the downlink transmission channel.

Example 16 includes the subject matter of Example 15, wherein the instructions, when executed, cause the wireless access point to specify a minimum resource unit for the uplink frame. The minimum resource unit corresponds to the uplink transmission channel. The resource allocation information is indicative of the minimum resource unit.

Example 17 includes the subject matter of Example 15, wherein the instructions, when executed, cause the wireless access point to generate a resource selection notification that notifies the wireless station to select a minimum resource unit for the uplink frame from among a plurality of available minimum resource units corresponding to available sub-channels of the downlink transmission channel. The minimum resource unit corresponds to the uplink transmission channel. The resource allocation information includes the resource selection notification.

Example 18 includes the subject matter of Examples 15-17, wherein the downlink bandwidth is 20 MHz.

Example 19 includes the subject matter of Examples 15-18, wherein the uplink bandwidth is about 2.03 MHz.

Example 20 includes the subject matter of Examples 15-19, wherein the uplink frame includes an acknowledgement frame.

Example 21 includes the subject matter of Examples 15-20, wherein station-specific downlink frame further includes timing information associated with a time by which the wireless station is to transmit the uplink frame to the wireless access point.

Example 22 is a wireless access point to schedule a narrowband response to wideband data. The wireless access point of Example 22 comprises means for identifying (a) a station identifier associated with a wireless station and (b) resource allocation information associated with an uplink transmission channel over which the wireless station is to transmit an uplink frame. The wireless access point of Example 22 further includes means for transmitting a station-specific downlink frame from the wireless access point to the wireless station over a downlink transmission channel. The downlink transmission channel has an associated downlink bandwidth. The station-specific downlink frame includes the station identifier and the resource allocation information. The wireless access point of Example 22 further includes means for receiving, based on the resource allocation information, the uplink frame at the wireless access point from the wireless station over the uplink transmission channel. The uplink transmission channel has an associated uplink bandwidth that is narrower than the downlink bandwidth of the downlink transmission channel. The uplink transmission channel is a sub-channel of the downlink transmission channel.

Example 23 includes the subject matter of Example 22, further including means for specifying a minimum resource unit for the uplink frame. The minimum resource unit corresponds to the uplink transmission channel. The resource allocation information is indicative of the minimum resource unit.

Example 24 includes the subject matter of Example 22, further including means for generating a resource selection notification that notifies the wireless station to select a minimum resource unit for the uplink frame from among a plurality of available minimum resource units corresponding to available sub-channels of the downlink transmission channel. The minimum resource unit corresponds to the uplink transmission channel. The resource allocation information includes the resource selection notification.

Example 25 includes the subject matter of Examples 22-24, wherein the downlink bandwidth is 20 MHz.

Example 26 includes the subject matter of Examples 22-25, wherein the uplink bandwidth is about 2.03 MHz.

Example 27 includes the subject matter of Examples 22-26, wherein the uplink frame includes an acknowledgement frame.

Example 28 includes the subject matter of Examples 22-27, wherein the station-specific downlink frame further includes timing information associated with a time by which the wireless station is to transmit the uplink frame to the wireless access point.

Example 29 is a wireless station to provide a narrowband response to wideband data. The wireless station of Example 29 comprises a receiver to receive a station-specific downlink frame at the wireless station from a wireless access point. The station-specific downlink frame is received over a downlink transmission channel having an associated downlink bandwidth. The station-specific downlink frame includes a station identifier associated with the wireless station. The station-specific downlink frame further includes resource allocation information associated with an uplink transmission channel over which the wireless station is to transmit an uplink frame. The wireless station of Example 29 further includes a communication manager to identify the uplink transmission channel based on the resource allocation information. The uplink transmission channel has an associated uplink bandwidth that is narrower than the downlink bandwidth of the downlink transmission channel. The uplink transmission channel is a sub-channel of the downlink transmission channel. The wireless station of Example 29 further includes a transmitter to transmit the uplink frame from the wireless station to the wireless access point over the uplink transmission channel.

Example 30 includes the subject matter of Example 29, wherein the resource allocation information includes information specifying a minimum resource unit for the uplink frame. The minimum resource unit corresponds to the uplink transmission channel.

Example 31 includes the subject matter of Example 29, wherein the communication manger is further to select, in response to the resource allocation information including a resource selection notification, a minimum resource unit for the uplink frame from among a plurality of available minimum resource units corresponding to available sub-channels of the downlink transmission channel. The minimum resource unit corresponds to the uplink transmission channel.

Example 32 includes the subject matter of Examples 29-31, wherein the downlink bandwidth is 20 MHz.

Example 33 includes the subject matter of Examples 29-32, wherein the uplink bandwidth is about 2.03 MHz.

Example 34 includes the subject matter of Examples 29-33, wherein the uplink frame includes an acknowledgement frame.

Example 35 includes the subject matter of Examples 29-34, wherein the station-specific downlink frame further includes timing information associated with a time by which the wireless station is to transmit the uplink frame to the wireless access point.

Example 36 is a method to provide a narrowband response to wideband data. The method of Example 36 comprises receiving a station-specific downlink frame at a wireless station from a wireless access point. The station-specific downlink frame is received over a downlink transmission channel having an associated downlink bandwidth. The station-specific downlink frame includes a station identifier associated with the wireless station. The station-specific downlink frame further includes resource allocation information associated with an uplink transmission channel over which the wireless station is to transmit an uplink frame. The method of Example 36 further includes transmitting, based on the resource allocation information, the uplink frame from the wireless station to the wireless access point over the uplink transmission channel. The uplink transmission channel has an associated uplink bandwidth that is narrower than the downlink bandwidth of the downlink transmission channel. The uplink transmission channel is a sub-channel of the downlink transmission channel.

Example 37 includes the subject matter of Example 36, wherein the resource allocation information includes information specifying a minimum resource unit for the uplink frame. The minimum resource unit corresponds to the uplink transmission channel.

Example 38 includes the subject matter of Example 36, further including, in response to the resource allocation information including a resource selection notification, selecting a minimum resource unit for the uplink frame from among a plurality of available minimum resource units corresponding to available sub-channels of the downlink transmission channel. The minimum resource unit corresponds to the uplink transmission channel.

Example 39 includes the subject matter of Examples 36-38, wherein the downlink bandwidth is 20 MHz.

Example 40 includes the subject matter of Examples 36-39, wherein the uplink bandwidth is about 2.03 MHz.

Example 41 includes the subject matter of Examples 36-40, wherein the uplink frame includes an acknowledgement frame.

Example 42 includes the subject matter of Examples 36-41, wherein the station-specific downlink frame further includes timing information associated with a time by which the wireless station is to transmit the uplink frame to the wireless access point.

Example 43 is a tangible machine-readable storage medium comprising instructions that, when executed, cause a wireless station to receive a station-specific downlink frame at the wireless station from a wireless access point. The station-specific downlink frame is received over a downlink transmission channel having an associated downlink bandwidth. The station-specific downlink frame includes a station identifier associated with the wireless station. The station-specific downlink frame further includes resource allocation information associated with an uplink transmission channel over which the wireless station is to transmit an uplink frame. The instructions of Example 43, when executed, cause the wireless station to, based on the resource allocation information, transmit the uplink frame from the wireless station to the wireless access point over the uplink transmission channel. The uplink transmission channel has an associated uplink bandwidth that is narrower than the downlink bandwidth of the downlink transmission channel. The uplink transmission channel is a sub-channel of the downlink transmission channel.

Example 44 includes the subject matter of Example 43, wherein the resource allocation information includes information specifying a minimum resource unit for the uplink frame. The minimum resource unit corresponds to the uplink transmission channel.

Example 45 includes the subject matter of Example 43, wherein the instructions, when executed, cause the wireless station to, in response to the resource allocation information including a resource selection notification, select a minimum resource unit for the uplink frame from among a plurality of available minimum resource units corresponding to available sub-channels of the downlink transmission channel. The minimum resource unit corresponds to the uplink transmission channel.

Example 46 includes the subject matter of Examples 43-45, wherein the downlink bandwidth is 20 MHz.

Example 47 includes the subject matter of Examples 43-46, wherein the uplink bandwidth is about 2.03 MHz.

Example 48 includes the subject matter of Examples 43-47, wherein the uplink frame includes an acknowledgement frame.

Example 49 includes the subject matter of Examples 43-48, wherein the station-specific downlink frame further includes timing information associated with a time by which the wireless station is to transmit the uplink frame to the wireless access point.

Example 50 is a wireless station to provide a narrowband response to wideband data. The wireless station of Example 50 comprises means for receiving a station-specific downlink frame at the wireless station from a wireless access point. The station-specific downlink frame is received over a downlink transmission channel having an associated downlink bandwidth. The station-specific downlink frame includes a station identifier associated with the wireless station. The station-specific downlink frame further includes resource allocation information associated with an uplink transmission channel over which the wireless station is to transmit an uplink frame. The wireless station of Example 50 further includes means for identifying the uplink transmission channel based on the resource allocation information. The uplink transmission channel has an associated uplink bandwidth that is narrower than the downlink bandwidth of the downlink transmission channel. The uplink transmission channel is a sub-channel of the downlink transmission channel. The wireless station of Example 50 further includes means for transmitting the uplink frame from the wireless station to the wireless access point over the uplink transmission channel.

Example 51 includes the subject matter of Example 50, wherein the resource allocation information includes information specifying a minimum resource unit for the uplink frame. The minimum resource unit corresponds to the uplink transmission channel.

Example 52 includes the subject matter of Example 50, further including means for selecting, in response to the resource allocation information including a resource selection notification, a minimum resource unit for the uplink frame from among a plurality of available minimum resource units corresponding to available sub-channels of the downlink transmission channel. The minimum resource unit corresponds to the uplink transmission channel.

Example 53 includes the subject matter of Examples 50-52, wherein the downlink bandwidth is 20 MHz.

Example 54 includes the subject matter of Examples 50-53, wherein the uplink bandwidth is about 2.03 MHz.

Example 55 includes the subject matter of Examples 50-54, wherein the uplink frame includes an acknowledgement frame.

Example 56 includes the subject matter of Examples 50-55, wherein the station-specific downlink frame further includes timing information associated with a time by which the wireless station is to transmit the uplink frame to the wireless access point.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A wireless access point to schedule a narrowband response to wideband data, the wireless access point comprising:
    a communication manager to:
        determine whether a downlink frame to be transmitted by the wireless access point is to carry data for more than one wireless station;
        configure the downlink frame as an orthogonal frequency-division multiple access (OFDMA) trigger frame in response to determining that the downlink frame is to carry data for more than one wireless station; and
        configure the downlink frame as a station-specific downlink frame in response to determining that the downlink frame is to carry data for only a single wireless station, the station-specific downlink frame including (a) a station identifier associated with the single wireless station and (b) resource allocation information associated with an uplink transmission channel over which the single wireless station is to transmit an uplink frame;
    a transmitter to transmit the station-specific downlink frame from the wireless access point to the single wireless station over a downlink transmission channel, the downlink transmission channel having an associated downlink bandwidth; and
    a receiver to, based on the resource allocation information, receive the uplink frame at the wireless access point from the single wireless station over the uplink transmission channel, the uplink transmission channel having an associated uplink bandwidth that is narrower than the downlink bandwidth of the downlink transmission channel, the uplink transmission channel being a sub-channel of the downlink transmission channel.

2. A wireless access point as defined in claim 1, wherein the communication manager is further to specify a minimum resource unit for the uplink frame, the minimum resource unit corresponding to the uplink transmission channel, the resource allocation information being indicative of the minimum resource unit.

3. A wireless access point as defined in claim 1, wherein the communication manager is further to generate a resource selection notification that notifies the single wireless station to select a minimum resource unit for the uplink frame from among a plurality of available minimum resource units corresponding to available sub-channels of the downlink transmission channel, the minimum resource unit corresponding to the uplink transmission channel, the resource allocation information including the resource selection notification.

4. A wireless access point as defined in claim 1, wherein the downlink bandwidth is 20 MHz and the uplink bandwidth is about 2.03 MHz.

5. A wireless access point as defined in claim 1, wherein the uplink frame includes an acknowledgement frame.

6. A wireless access point as defined in claim 1, wherein the station-specific downlink frame further includes timing information associated with a time by which the single wireless station is to transmit the uplink frame to the wireless access point.

7. A method to schedule a narrowband response to wideband data, the method comprising:
    determining whether a downlink frame to be transmitted by a wireless access point is to carry data for more than one wireless station;
    in response to determining that the downlink frame is to carry data for more than one wireless station, configuring the downlink frame as an orthogonal frequency-division multiple access (OFDMA) trigger frame; and
    in response to determining that the downlink frame is to carry data for only a single wireless station:
        identifying a station identifier associated with the single wireless station;
        identifying resource allocation information associated with an uplink transmission channel over which the single wireless station is to transmit an uplink frame;

configuring the downlink frame as a station-specific downlink frame including the station identifier and the resource allocation information;

transmitting the station-specific downlink frame from the wireless access point to the single wireless station over a downlink transmission channel, the downlink transmission channel having an associated downlink bandwidth; and based on the resource allocation information, receiving the uplink frame at the wireless access point from the single wireless station over the uplink transmission channel, the uplink transmission channel having an associated uplink bandwidth that is narrower than the downlink bandwidth of the downlink transmission channel, the uplink transmission channel being a sub-channel of the downlink transmission channel.

8. A method as defined in claim 7, wherein identifying the resource allocation information includes specifying a minimum resource unit for the uplink frame, the minimum resource unit corresponding to the uplink transmission channel, the resource allocation information being indicative of the minimum resource unit.

9. A method as defined in claim 7, wherein identifying the resource allocation information includes generating a resource selection notification that notifies the single wireless station to select a minimum resource unit for the uplink frame from among a plurality of available minimum resource units corresponding to available sub-channels of the downlink transmission channel, the minimum resource unit corresponding to the uplink transmission channel, the resource allocation information including the resource selection notification.

10. A method as defined in claim 7, wherein the downlink bandwidth is 20 MHz and the uplink bandwidth is about 2.03 MHz.

11. A method as defined in claim 7, wherein the uplink frame includes an acknowledgement frame.

12. A method as defined in claim 7, wherein the station-specific downlink frame further includes timing information associated with a time by which the single wireless station is to transmit the uplink frame to the wireless access point.

13. A tangible machine-readable storage medium comprising instructions that, when executed, cause a wireless access point to, at least:

determine whether a downlink frame to be transmitted by Flail the wireless access point is to carry data for more than one wireless station;

in response to determining that the downlink frame is to carry data for more than one wireless station, configure the downlink frame as an orthogonal frequency-division multiple access (OFDMA) trigger frame; and in response to determining that the downlink frame is to carry data for only a single wireless station:

identify a station identifier associated with the single wireless station;

identify resource allocation information associated with an uplink transmission channel over which the single wireless station is to transmit an uplink frame;

configure the downlink frame as a station-specific downlink frame including the station identifier and the resource allocation information;

transmit the station-specific downlink frame from the wireless access point to the single wireless station over a downlink transmission channel, the downlink transmission channel having an associated downlink bandwidth; and based on the resource allocation information, receive the uplink frame at the wireless access point from the single wireless station over the uplink transmission channel, the uplink transmission channel having an associated uplink bandwidth that is narrower than the downlink bandwidth of the downlink transmission channel, the uplink transmission channel being a sub-channel of the downlink transmission channel.

14. A machine-readable storage medium as defined in claim 13, wherein the instructions, when executed, cause the wireless access point to specify a minimum resource unit for the uplink frame, the minimum resource unit corresponding to the uplink transmission channel, the resource allocation information being indicative of the minimum resource unit.

15. A machine-readable storage medium as defined in claim 13, wherein the instructions, when executed, cause the wireless access point to generate a resource selection notification that notifies the single wireless station to select a minimum resource unit for the uplink frame from among a plurality of available minimum resource units corresponding to available sub-channels of the downlink transmission channel, the minimum resource unit corresponding to the uplink transmission channel, the resource allocation information including the resource selection notification.

16. A machine-readable storage medium as defined in claim 13, wherein the downlink bandwidth is 20 MHz and the uplink bandwidth is about 2.03 MHz.

17. A machine-readable storage medium as defined in claim 13, wherein the uplink frame includes an acknowledgement frame.

18. A machine-readable storage medium as defined in claim 13, wherein the station-specific downlink frame further includes timing information associated with a time by which the single wireless station is to transmit the uplink frame to the wireless access point.

19. A wireless access point as defined in claim 1, wherein the OFDMA trigger frame is to be transmitted by the transmitter to the plurality of wireless stations over a downlink transmission channel to a plurality of wireless stations associated with the OFDMA trigger frame, the downlink transmission channel having an associated downlink bandwidth, the OFDMA trigger frame to be parsed by the plurality of wireless stations to determine respective uplink transmission channels having respective associated uplink bandwidths for corresponding respective ones of the plurality of wireless stations, respective ones of the associated uplink bandwidths being narrower than the downlink bandwidth of the downlink transmission channel.

20. A method as defined in claim 7, further including:

transmitting the OFDMA trigger frame over a downlink transmission channel to a plurality of wireless stations associated with the OFDMA trigger frame, the downlink transmission channel having an associated downlink bandwidth, the OFDMA trigger frame to be parsed by the plurality of wireless stations to determine respective uplink transmission channels having respective associated uplink bandwidths for corresponding respective ones of the plurality of wireless stations, respective ones of the associated uplink bandwidths being narrower than the downlink bandwidth of the downlink transmission channel.

21. A machine-readable storage medium as defined in claim 13, wherein the instructions, when executed, further cause the wireless access point to:

transmit the OFDMA trigger frame over a downlink transmission channel to a plurality of wireless stations associated with the OFDMA trigger frame, the downlink transmission channel having an associated downlink bandwidth, the OFDMA trigger frame to be parsed by the plurality of wireless stations to determine respective uplink transmission channels having respective associated uplink bandwidths for corresponding respective ones of the plurality of wireless stations, respective ones of the associated uplink bandwidths being narrower than the downlink bandwidth of the downlink transmission channel.

22. A wireless access point as defined in claim 1, wherein the wireless access point, the single wireless station, the station-specific downlink frame, and the uplink frame are IEEE 802.11ax compliant.

23. A wireless access point as defined in claim 1, wherein the OFDMA trigger frame has a first associated network overhead and the station-specific downlink frame has a second associated network overhead less than the first associated network overhead.

24. A method as defined in claim 7, wherein the OFDMA trigger frame has a first associated network overhead and the station-specific downlink frame has a second associated network overhead less than the first associated network overhead.

25. A machine-readable storage medium as defined in claim 13, wherein the OFDMA trigger frame has a first associated network overhead and the station-specific downlink frame has a second associated network overhead less than the first associated network overhead.

* * * * *